United States Patent
Vettigli et al.

(10) Patent No.: US 12,092,351 B2
(45) Date of Patent: Sep. 17, 2024

(54) HVAC MONITORING METHOD AND APPARATUS

(71) Applicant: Centrica PLC, Windsor (GB)

(72) Inventors: Giuseppe Vettigli, Windsor (GB); Miroslav Hamouz, Windsor (GB)

(73) Assignee: Centrica PLC, Windsor (GB)

( * ) Notice: Subject to any disclaimer, the term of this patent is extended or adjusted under 35 U.S.C. 154(b) by 123 days.

(21) Appl. No.: 16/826,350

(22) Filed: Mar. 23, 2020

(65) Prior Publication Data

US 2020/0309400 A1 Oct. 1, 2020

(30) Foreign Application Priority Data

Mar. 29, 2019 (GB) ...................................... 1904450

(51) Int. Cl.
| | |
|---|---|
| *F24F 11/64* | (2018.01) |
| *F24F 11/38* | (2018.01) |
| *F24F 11/46* | (2018.01) |
| *F24F 11/58* | (2018.01) |
| *G05B 13/02* | (2006.01) |

(Continued)

(52) U.S. Cl.
CPC .............. *F24F 11/64* (2018.01); *F24F 11/38* (2018.01); *F24F 11/46* (2018.01); *F24F 11/58* (2018.01); *G05B 13/0265* (2013.01); *G05B 13/042* (2013.01); *G06F 16/285* (2019.01)

(58) Field of Classification Search
CPC .. F24F 11/30; F24F 11/47; F24F 11/46; F24F 11/52; F24F 11/61; F24F 11/62; F24F 11/63; F24F 2110/00; F24F 2110/10; F24F 2130/00; F24F 2130/10; F24F 2140/50; F24F 2140/60; G05D 23/1917; G01K 13/00; G06N 20/20; G06N 7/005; H04L 12/2823

See application file for complete search history.

(56) References Cited

U.S. PATENT DOCUMENTS

| | | | |
|---|---|---|---|
| 5,415,346 A * | 5/1995 | Bishop | G05D 23/1917 236/78 D |
| 10,274,382 B1 * | 4/2019 | Trundle | G01K 13/00 |

(Continued)

*Primary Examiner* — Kenneth M Lo
*Assistant Examiner* — Tameem D Siddiquee
(74) *Attorney, Agent, or Firm* — Woodard Emhardt Henry Reeves & Wagner

(57) ABSTRACT

Methods and devices for detecting inefficiencies in environmental control systems and for building a model for detecting the same. The model building method may comprise: receiving training data sets for one or more environmental control systems, identifying a category for each training data set indicative of the efficiency of the environmental control system over the training time period, computing one or more numerical features for each training data set based on setpoint data and sensor data, determining a measure of dependence between the identified category and the computed one or more numerical features, and creating a model based on the determined measure of dependence. The detection method may involve receiving a monitored data set, computing numerical features for the monitored data, and assigning a category indicative of the efficiency of a monitored environmental control system based on the model and the numerical features.

21 Claims, 10 Drawing Sheets

(51) Int. Cl.
    *G05B 13/04*     (2006.01)
    *G06F 16/28*     (2019.01)

(56)                References Cited

U.S. PATENT DOCUMENTS

2012/0065935 A1*   3/2012  Steinberg ............ G01M 99/005
                                                      702/182
2014/0312128 A1*  10/2014  Matsuoka .......... G05D 23/1917
                                                       236/51
2015/0127174 A1*   5/2015  Quam .................... G05B 15/02
                                                      700/276
2015/0330650 A1*  11/2015  Abiprojo .................. F24F 11/30
                                                      700/276
2018/0113482 A1*   4/2018  Vitullo ............... G05D 23/1917
2020/0355387 A1*  11/2020  Samuni .................... F24F 11/64

\* cited by examiner

HVAC MONITORING METHOD AND APPARATUS

BACKGROUND

The present application relates to diagnosing and improving the efficiency of environmental control systems, also known as heating, ventilation and air conditioning (HVAC) systems. In particular, the application relates to training methods and systems to identify the efficiency of HVAC systems, which can provide efficiency alerts and/or solutions to improve efficiency.

An efficient HVAC system has an optimal energy usage resulting in a fair bill for the user and limited carbon emissions. Unfortunately, the common user is not able to rate his own heating systems as it requires substantial expertise about how it works and, even in case the expertise is available, modern HVAC components, such as boilers, air conditioning units, heat exchangers etc., may not expose the necessary data. Furthermore, current diagnostic systems for identifying faults in HVAC systems may report false alerts about faults when in fact the system is simply set up inefficiently.

Therefore there is a need to provide an improved, automated means to evaluate HVAC system efficiency and/or identify faults.

SUMMARY OF THE INVENTION

Aspects of the invention are set out in the independent claims and preferable features are set out in the dependent claims.

There is described herein: a method of building a model for detecting inefficiencies in environmental control systems, each arranged to control at least one environmental characteristic at a premises, the method comprising: receiving a plurality of training data sets for one or more environmental control systems, each training data set comprising setpoint data and sensor data for an environmental characteristic at a premises controlled by an environmental control system; identifying a category for each training data set indicative of the efficiency of the environmental control system; computing one or more numerical features for each training data set based on the setpoint data and sensor data; determining a measure of dependence between the identified category and the computed one or more numerical features; and creating a model based on the determined measure of dependence, wherein the model is configured to assign a category indicative of the efficiency of a monitored environmental control system based on a monitored data set comprising setpoint data and sensor data for an environmental characteristic at the premises controlled by the monitored environmental control system over a monitoring time period.

By providing an efficiency model which is based on setpoint data and sensor data from a plurality of data sets, it is possible to provide automated means for identifying the efficiency of environmental control systems. Advantageously, efficiency ratings can be used to increase the efficiency of the system, to diagnose faults or reasons for inefficiencies with environmental control systems, or even filter false alerts for faults. By applying precharacterised data from a plurality of data sets to a limited data set from a monitored system and utilising numerical features calculated from the data sets it is possible to take into account a range of factors to determine efficiencies.

The setpoint, which may also be referred to as a target setpoint, is a target value for the environmental characteristic. For example, where the environmental characteristic is temperature, the setpoint may be a minimum target temperature (e.g. where the environmental control system includes a heating appliance or device, such as a boiler, radiator or other space heater etc.). Thus meeting the target value may mean that a measured temperature is equal to or exceeds the target value. Whereas for a cooling or air conditioning system, meeting the target value may be when the temperature is equal to or falls below the target or setpoint.

The numerical features for each training data set are based on the setpoint data and sensor data of that data set. For example the numerical features may be calculated from the setpoint and sensor data.

Each environmental control system for which training data sets are received is arranged to control at least one environmental characteristic at a premises. Preferably the plurality of training data sets comprises data sets relating to multiple different environmental control systems (preferably each system controlling a different premises). However in some embodiments a portion of the plurality of training data sets may relate to the same environmental control system over different time periods, e.g. on different days or weeks. In other words, each of the plurality of data sets may correspond to a different environmental control system, or more than one of the data sets may correspond to the same environmental control system.

The premises could be a home or business location. Generally the premises is at least a part of a building, or an entire building; for example in some cases the premises controlled by the environmental control system may be a floor or room within a building.

The model created based on the determined measure of dependence is preferably a model that can be used for detecting inefficiencies in environmental control systems.

Data relating to an environmental characteristic over a time period, e.g. a training or monitoring time period, relates to data collected or monitored or measured during that time period, or target or setpoint values for that time period. The sensor data may be measured or recorded by a sensor at the premises during the relevant time period, such as a temperature or humidity sensor. The sensor data may be, for example, one of: temperature; water temperature; pressure; and humidity. Where the sensor data is temperature data, it may refer to: water temperature, or room or other ambient temperature; e.g. if a boiler heats domestic hot water, the water temperature in or exiting a hot water tank may be suitable and if a boiler heats a swimming pool, the pool water temperature may be measured.

The plurality of training data sets comprises at least 30 training data sets, preferably at least 50 training data sets, more preferably at least 100 training data sets. Generally the plurality of training data sets is fewer than 1000, or even fewer than 500 training data sets. Generally the training data sets relate to at least 20 different environmental control systems, preferably at least 40 different environmental control systems, more preferably at least 80 different environmental control systems. The more training data sets are used, the more accurate the model may be as there are more likely to be a greater range of different circumstances that provide the data.

The step of identifying a category may comprise outputting to a human operator a visual representation of each of the training data sets; and receiving an input from the human operator indicative of the category. The visual representation may comprise, for example, a graph of the data set. The visual representation may be presented on a user interface, such as a computer monitor, or tablet screen. The human operator may be able to spot problems and inefficiencies in monitoring systems based on knowledge acquired from working with environmental control systems, and thus such a human input can be a useful way to train the model.

Preferably, the step of identifying a category comprises: receiving diagnostic data relating to the operation of one or more appliances in the environmental control system during the training time period; preferably said diagnostic data being recorded by an appliance monitoring device at the premises, or wherein the appliance is a smart appliance and the diagnostic data is reported by the appliance itself. Thus the training data and corresponding efficiency categories may be received from environmental control systems which have sophisticated diagnostics which can be used to diagnose the efficiency, and thus a model can be built that can use just environmental characteristic setpoint and sensor data for determining the efficiencies of systems without such sophisticated diagnostics (e.g. dumb or non-smart appliances and/or no diagnostic/monitoring system).

Optionally, the step of identifying a category comprises: receiving utility consumption data for the environmental control system; for example gas, oil or electricity consumption data. For example the utility consumption data may be received from a utility meter at the premises, or from a smart plug. Identifying an efficiency category may be based on the quantity or rate of utility consumption. For example, utility consumption data may be compared to a threshold utility consumption. Such a determination may also take into account the size or thermal capacity of the premises for which environmental control is provided and/or external parameters, such as an external environmental temperature or Optionally, the method further comprises: receiving a monitored data set comprising setpoint data and sensor data for a monitored environmental characteristic over a monitoring time period; computing one or more numerical features for the monitored data set based on the setpoint data and sensor data; and assigning a category indicative of the efficiency of the monitored environmental control system based on the created model and the one or more numerical features of the monitored data set.

There is also described herein a method of detecting inefficiencies in a monitored environmental control system arranged to control at least one environmental characteristic at a premises, the method comprising: receiving a monitored data set comprising setpoint data and sensor data for an environmental characteristic over a monitoring time period; computing one or more numerical features for the monitored data set based on the setpoint data and sensor data; receiving a model for detecting inefficiencies in environmental control systems, the model relating efficiency of environmental control systems to numerical features derivable from a data set comprising setpoint data and sensor data for an environmental characteristic controlled by environmental control systems; and assigning a category indicative of the efficiency of the monitored environmental control system based on the received model and the one or more numerical features of the monitored data set.

The received model may be created according to a method as described above.

Preferably, each data set further comprises external environmental characteristic data relating to the environmental characteristic external to the premises; preferably measured by a sensor in the vicinity of the premises. The external environmental characteristic data could be, for example, outside temperature, which may be measured by a temperature sensor outside (or adjacent) the premises, or may be received from a central system, e.g. a remote server, such as from a weather forecast service. The vicinity of the premises may relate to a predetermined area surrounding the premises, for example within 100 meters or 200 meters, or within 400 meters of the premises.

Preferably the external environmental characteristic data is used in computing the one or more numerical features. For example, the one or more numerical features may comprise the mean, median, maximum and/or minimum difference between the value of the external environmental characteristic and the setpoint for the environmental characteristic over the monitored or training time period.

Preferably, each data set further comprises control signal data for one or more appliances of the environmental control system. For example, where the environmental control system is configured to regulate room temperature, the control signal may be a "call for heat" signal. The call for heat signal may be directed to a boiler or space heater. The external environmental characteristic data and/or the control signal data may also be used in the model to determine an efficiency measure or category. In some embodiments, at least one of the one or more numerical features is based on the control signal data.

A method according to any preceding claim, further comprising: receiving a time series of setpoint values and sensor values for an extended time period; dividing the extended time period into one or more regular, predetermined time slots to develop one or more data sets of setpoint values and sensor values, each data set corresponding to one of the time slots. Preferably the time slots are one day periods; alternatively the time slots could be one week, or two days, or even 4 hours, 8 hours or 12 hours. Generally the time slots are at least 8 hours in length and not more than two weeks, preferably at least 12 hours and not more than one week.

Computing the one or more numerical features for a data set based on the setpoint data and sensor data may comprise: identifying one or more activation periods of appliances of the environmental control system for the monitoring or training period; computing the length of each of the identified one or more activation periods; and using the computed length of each of the activation periods to compute the one or more numerical features for the data set. An activation period preferably refers to the time for which the environmental control system, or a component thereof, is in operation to alter or maintain the environmental characteristic, or during which the system or component should ordinarily be in operation (e.g. as indicated by a control signal or schedule), even if it is not actually active (e.g. due to a fault). An activation period may also be referred to as an "operational period".

Preferably, identifying the activation period comprises detecting the start and/or end of the activation period.

In some embodiments, one or both of the start and end of the activation period are detected in dependence on a control signal used to control the environmental control system. The control signal may be received from a control component of the environmental control system, preferably from a thermostat. The control signal may be part of a received data set (e.g. the monitoring and/or training data sets). Preferably the control signal is a control signal for controlling a component (or appliance) of the environmental control system adapted to influence the environmental characteristic. Preferably the component is a heating or cooling device. The component may be one of: a boiler; an air conditioning unit; a furnace; a heat pump; a fan; and a dehumidifier. For example, where the environmental control system is configured to regulate room temperature, the control signal may be a "call for heat" signal. The call for heat signal may be directed to a boiler.

In some embodiments, one or both of the start and end of the activation period are detected in dependence on a difference between the setpoint value and a current sensor value of the environmental characteristic. In other words, it may be inferred that the system or component should be active instead of or in addition to relying on a specific activation signal. Preferably the method comprises one or both of: inferring the start of the activation period in response to detecting a current measured value of the environmental control characteristic not meeting the target value; and/or inferring the end of the activation period in response to detecting a current measured value of the environmental control characteristic meeting the target value. For example, for a heating system, meeting the target value may mean that a measured temperature is equal to or exceeds the target value. Whereas for a cooling or air conditioning system, meeting the target value may be when the temperature is equal to or falls below the target.

Preferably, computing one or more numerical features for a data set based on the setpoint data and sensor data comprises: computing the difference between the setpoint for an environmental characteristic and the sensor value of the environmental characteristic during activation periods, and optionally across the whole training or monitoring period.

Preferably, the numerical features comprise one or more of: the largest, mean and median values of the length of one or more activation periods of appliances of the environmental control system in the monitoring or training period.

In some embodiments, the numerical features comprise one or more of: a frequency or rate of activation periods of appliances of the environmental control system in the monitoring or training period.

In some embodiments, the numerical features comprise: the mean length of activation periods of the environmental control system over the monitoring or training period; the length of the longest activation period of the environmental control system in the monitoring or training period; the mean of the difference between the setpoint value and the sensor value of the environmental characteristic over the monitoring or training period; and the minimum value of the difference between the setpoint value and the sensor value of the environmental characteristic in the monitoring or training period. The inventors have found that using the combination of these four particular numerical features provides an optimal model.

In alternative embodiments, the maximum value of the difference between the setpoint value and the sensor value of the environmental characteristic in the monitoring or training period, in addition or alternatively to the minimum value.

Preferably the activation period is a heating period for the environmental control system.

In some embodiments, the numerical features comprise one or more of: the mean, median, maximum and minimum values of the difference between the setpoint value and the sensor value of the environmental characteristic in the monitoring or training period.

In some embodiments, the model comprises a regression model, such as a linear regression model or a non-linear regression model.

In some embodiments, the model comprises a decision tree, for example the model may comprise a random forest, or random decision forest.

Preferably, the model comprises one or more rules for assigning a category indicative of the efficiency of the monitored environmental control system based on the numerical features, each rule comprising a threshold value for the numerical feature.

In some embodiments, each rule provides a first category to assign, or first possible range of categories to assign, when the numerical feature is below the threshold value and a second possible range of categories to assign, or second possible range of categories to assign, when the numerical feature is above the threshold value. In some embodiments the value of the numerical feature being equal to the threshold value results in the rule returning a first category or first possible range of categories, whilst in other embodiments the value of the numerical feature being equal to the threshold value results in the rule returning a first category or first possible range of categories.

Preferably, the one or more numerical features comprise at least two numerical features and wherein the received or created model comprises two or more rules for assigning a category indicative of the efficiency of the monitored environmental control system based on the numerical features.

Optionally, the one or more numerical features comprise at least two numerical features and wherein the model comprises a weighting for each of the numerical features for assigning the category. Preferably the categories are numerical categories, such as consecutive integer values.

Preferably, the method further comprises: outputting the assigned category. Outputting may comprise outputting to a user or operator, preferably remotely, e.g. via long range communication. Outputting may additionally or alternatively comprise displaying the assigned category.

Preferably, the method further comprises: identifying a solution based on the assigned category. In some embodiments, the solution comprises adjusting the setpoint for the environmental control system, e.g. by sending a command to the environmental control system to adjust the setpoint in response to identifying the solution.

Preferably, the method further comprises:
in response to identifying the solution, providing a message to a user, the message comprising a selectable option to adjust the setpoint; and in response to receiving a user selection of the option to adjust the setpoint, sending a command to the environmental control system to adjust the setpoint.

In some embodiments, the method further comprises: alerting a user associated with the environmental control system in response to assigning a category indicative of an inefficient system, the alerting preferably comprising one or more of: displaying an alert on a display associated with the environmental control system; and transmitting an alert message to a user device associated with the user, preferably a personal or mobile computing or communications device. The message may indicate what sort of repair or maintenance is required, and may provide a user or engineer with information relating to the underperformance condition which helps to diagnose a fault. The message may also give the user the option of automatically requesting an engineer or repair service.

The method may further comprise, in response to assigning a category indicative of an inefficient system, initiating a test procedure for testing the environmental control system. For example, the test procedure may comprise: activating the environmental control system, the activating optionally overriding a control schedule active for the monitored environmental control system; measuring changes in the environmental characteristic in response to activation of the environmental control system; and performing further analysis of measured sensor data relating to the environmental characteristic to identify, quantify and/or classify the underperformance condition.

In some embodiments, the method further comprises: suppressing or filtering one or more alerts about the monitored environmental control system in response to assigning a category indicative of an inefficient system.

There is also described herein a non-transient computer-readable medium comprising instructions which, when executed by a computer, cause the computer to carry out any method substantially as described above.

There is also described a monitoring system having means for performing any method as set out above.

There is also described an analysis server for building a model for detecting inefficiencies in environmental control systems, each arranged to control at least one environmental characteristic at a premises, the server comprising: means (such as a communication interface) for receiving a plurality of training data sets for a corresponding plurality of environmental control systems, each training data set comprising setpoint data and sensor data for an environmental characteristic at the premises controlled by the corresponding environmental control system; means (such as a processor) for identifying a category for each training data set indicative of the efficiency of the environmental control system; means (such as a processor) for computing one or more numerical features for each training data set based on the setpoint data and sensor data; means (such as a processor) for determining a measure of dependence between the assigned category and the computed one or more numerical features; and means (such as a processor) for creating a model based on the determined measure of dependence, wherein the model is configured to assign a category indicative of the efficiency of a monitored environmental control system based on a monitored data set comprising setpoint data and sensor data for an environmental characteristic at the premises controlled by the monitored environmental control system.

There is also described herein: a monitoring device or server for detecting inefficiencies in a monitored environmental control system arranged to control at least one environmental characteristic at a premises, the device or server comprising: means (such as a communication interface) for receiving a monitored data set comprising setpoint data and sensor data for an environmental characteristic over a monitoring time period; means (such as a processor) for computing one or more numerical features for the monitored data set based on the setpoint data and sensor data; means for receiving (such as a communication interface) or storing (such as a memory) or creating (such as a processor) a model for detecting inefficiencies in environmental control systems, the model relating efficiency of environmental control systems to numerical features derivable from a data set comprising setpoint data and sensor data for an environmental characteristic controlled by environmental control systems; and means (such as a processor) for assigning a category indicative of the efficiency of the monitored environmental control system based on the received model and the one or more numerical features of the monitored data set.

The monitoring device or server may further comprise an output (such as a user interface or communication interface) for outputting the assigned category.

The device or server may be arranged to perform or participate in any method substantially as set out above.

Preferably, the environmental characteristic(s) are each one of: temperature, humidity, pressure, sound. The sensor data may be, for example, one of: temperature; water temperature; pressure; and humidity. Where the sensor data is temperature data, it may refer to: water temperature, or room or other ambient temperature; e.g. if a boiler heats domestic hot water, the water temperature in or exiting a hot water tank may be suitable and if a boiler heats a swimming pool, the pool water temperature may be measured.

Preferably, the setpoint data comprises a time series of target values for the environmental characteristic, preferably user-selected target values.

Each of the training time period(s) and/or monitoring time period(s) may be equal time lengths of predetermined time, for example one day or one week.

In some embodiments, the environmental control system comprises at least one appliance selected from: a boiler; an air conditioning unit; a furnace; a heat pump; a fan; and a dehumidifier.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

Methods and systems for identifying HVAC system efficiency and creating models for doing the same are described by way of example only, in relation to the Figures, wherein.

DETAILED DESCRIPTION

Figure 1:
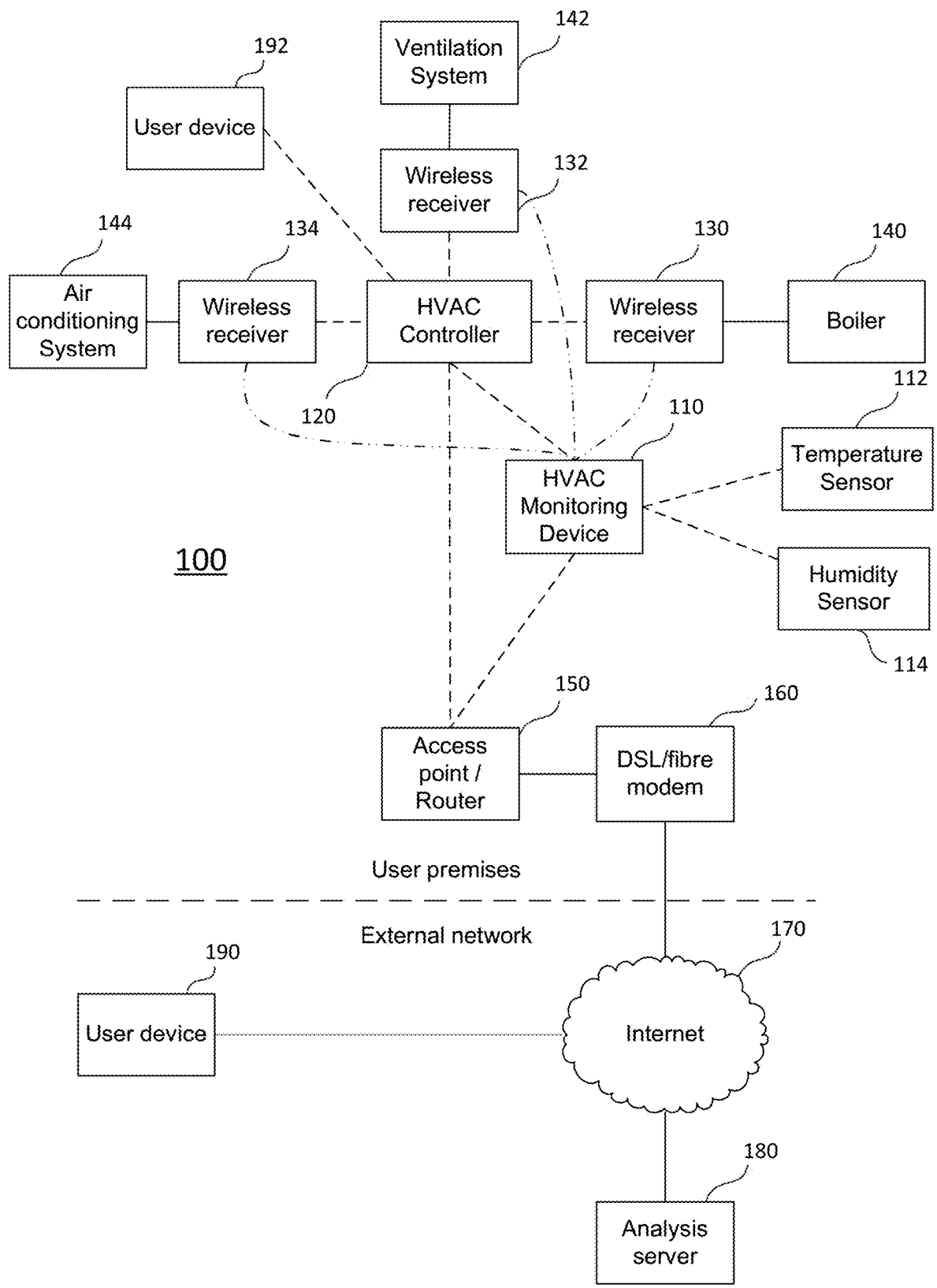
FIG. 1 illustrates a system diagram of an example environmental control and monitoring system.

FIG. 1 illustrates a system diagram of an exemplary environmental control and monitoring system 100. The HVAC control and monitoring system 100 includes an HVAC monitoring device 110 installed in a user's premises. The HVAC monitoring device 110 is wirelessly connected to a temperature sensor 112 and a humidity sensor 114 installed within the user's premises. However the sensors 112, 114 may be combined in the HVAC monitoring device 110. Alternatively the sensors 112,114 may communicate with the HVAC monitoring device 110 via wired connections.

The HVAC monitoring device 110 is in wireless communication with an HVAC controller 120. The HVAC controller 120 may be, for example, a smart thermostat into which a user can program a heating, hot water or other environmental control schedule. Of course, the HVAC monitoring device 110 itself (optionally, along with the temperature sensor 112 and humidity sensor 114) could be incorporated into the HVAC controller 120, and/or may make use of one or more sensors (e.g. temperature and/or humidity) already provided in the thermostat.

The HVAC monitoring device 110 and HVAC controller 120 are connected wirelessly to the user's local network/internet access infrastructure, for example, to a wireless or wired home router/access point 150, which in turn provides access to the Internet 170 through a modem 160, such as an ADSL or fibre modem. Depending on access technology, router 150 and modem 160 may be combined in a single device or replaced with other access devices appropriate to the access technology. Some embodiments may provide an additional hub device (not shown), e.g. connected to the boiler (incorporating wireless receiver 130), to manage the HVAC system and coordinate between the components, store control/configuration data (e.g. heating schedules), and the like (such functionality may alternatively be implemented in the HVAC controller 120).

The HVAC controller 120 is wirelessly connected to three wireless receivers 130, 132, 134. One wireless receiver 130 is connected by a wired connection to a central heating/hot water boiler 140, another wireless receiver 132 is connected by a wired connection to a ventilation system 142 and the third wireless receiver 134 is connected by a wired connection to an air conditioning system 144. The boiler 140 may, for example, be a conventional gas boiler arranged to provide a supply of heated water to a series of radiators in the user's premises and to a hot water tank for onward supply to hot water taps. The ventilation system 142 may be, for example, a humidity controlled ventilation system.

Although three HVAC components 140, 142, 144 (and therefore three wireless receivers 130, 132, 134) are shown, in some embodiments only one or two HVAC components may be provided, whilst in other embodiments there may be more and/or different HVAC components with wireless receivers which can communicate wirelessly with the HVAC controller 120. In some embodiments the wireless receivers can be included in the HVAC components, such as the boiler or air conditioning system, rather than being provided as separate devices.

The HVAC controller 120 can store schedule and other information relevant to the control information of the HVAC components. The HVAC controller 120 can then send control and/or schedule information to the wireless receivers 130, 132, 134. For example the user can program a schedule for hot water at the HVAC controller 120, and the HVAC controller 120 can then send the hot water schedule to the wireless receiver 130. The wireless receiver 130 can then use the schedule and temperature information received from the HVAC controller 120 to turn the boiler 140 on or off as needed. Alternatively, the HVAC controller 120 may send a control signal to the wireless receiver 130 to instruct the boiler 140 to start or stop producing hot water each time hot water is required according to the schedule.

The user can also program space heating or other environmental control requirements into the HVAC controller 120. Typically, this involves programming a heating schedule specifying a set of heating set points applicable during respective time periods, each set point defining a target temperature value to be achieved and maintained during the period. For example, the user may request a room temperature of 20° C. between 7 am and 9 am. Other periods in the schedule may be designated as "off" periods where no heating is required (though the system may nevertheless apply some minimum target e.g. 5° C. during such periods to protect against frost damage). The HVAC controller 120 receives a room temperature reading (either from its own internal temperature sensor, or from temperature sensor 112) and can provide control signals to the boiler 140 (via wireless receiver 130) or to the air conditioning system 144 (via wireless receiver 134), as appropriate (e.g. to increase or decrease the temperature back to the scheduled target value).

The user may also interact with the HVAC system from a user device 190 located outside the user's premises on an external network and connected to the Internet 170. In some embodiments a user device 192 is located at the user premises and can be connected wirelessly (or by wired connections) to the user's local network, e.g. as shown the user device 192 can be in wireless communication with the HVAC controller 120. User devices 190, 192 may take the form of smartphones, tablet computers, personal computers, and the like. User devices may include an application for controlling the heating system, for example to create or edit a heating/hot water schedule, switch between manual/scheduled operation, adjust temperature, activate boost mode, etc. The application may then send information to the HVAC controller 120 as required (e.g. to update a schedule).

The HVAC controller 120 sends to the HVAC monitoring device 110 the control schedule and/or any control commands sent to the HVAC components. The temperature sensor 112 and the humidity sensor 114 take readings frequently, e.g. every 2 minutes, and send the readings to the HVAC monitoring device 110. The HVAC monitoring device 110 can log the received schedule, control commands and readings.

The HVAC monitoring device 110 can also alternatively send the control information and sensed information to a remote datacentre such as analysis server 180 on an external network, e.g. via its connection to the Internet 170. The remote datacentre 180 can log this information and store for analysis information ascribed to periods during which HVAC components are operating. Alternatively, the logging, storage and analysis process can be performed at the HVAC monitoring device 110, without the need for a remote datacentre 180.

While this description has focused on the home environment, the invention can also be used in offices or other premises in which environmental conditions such as room temperature and humidity are controlled.

Although only a single temperature sensor and a single humidity sensor installed in at least one room in the user's premises are described above, in some embodiments multiple sensors may be provided at different locations within the premises so that more information about the performance of the HVAC system can be collected. In some cases multiple sensors can improve the accuracy of the monitoring.

It is also possible to position sensors outside the environment controlled by the HVAC system (e.g. air temperature and humidity sensor located outside a house). By measuring outside characteristics, it may be possible to get further insights into the performance of the system (e.g. more heat may be required to maintain a target room temperature if it is colder outside).

In this embodiment the HVAC monitoring device 110 is shown in communication with HVAC controller 120 and thus HVAC monitoring device 110 obtains receives details of control commands sent to the HVAC appliances, in alternative embodiments the HVAC monitoring device 110 does not receive details of control commands from the HVAC controller 120. Preferably the HVAC monitoring device 110 receives details of the programmed setpoints/schedule. However it may receive these from the remote analysis server 180 and/or from one of the user devices 190, 192.

Figure 2:
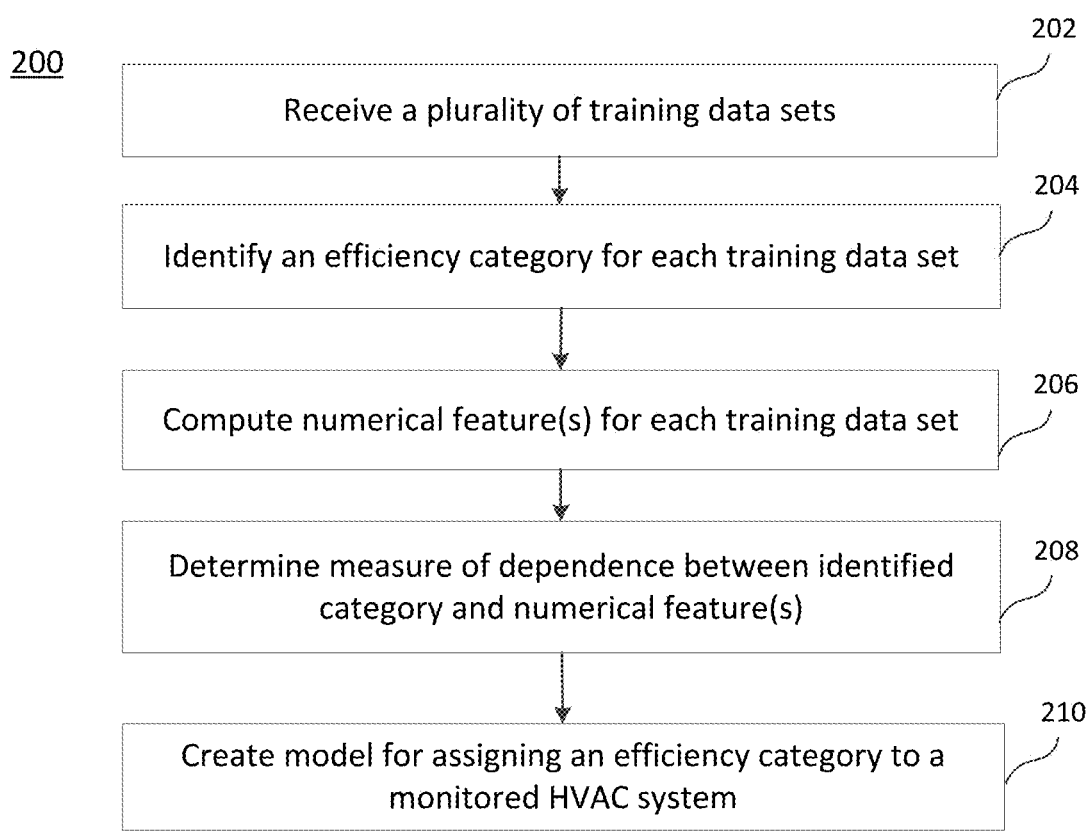
FIG. 2 shows an example method for creating a model for assigning efficiency categories to HVAC systems.

FIG. 2 shows an example method 200 for developing a model for identifying efficiency of HVAC systems, such as the HVAC system shown in FIG. 1.

The method 200 is generally performed at a central server, such as analysis server 180.

In step 202 a plurality of training data sets are received. For example Each training data set relates to the performance of an environmental control system arranged to control one or more environmental parameters at a premises. The environmental parameters may be temperature, humidity, pressure etc. Each environmental control system generally comprises one or more appliances or components for controlling environmental parameters, such as the HVAC devices 140, 142, 144 shown in FIG. 1. The training data sets may each relate to a different environmental control system, or some of the training data sets may relate to the same environmental control system but over different time periods.

Each training data set comprises setpoint data and sensor data for an environmental characteristic. The setpoint data comprises target values for the environmental characteristic, which may be selected by a user, e.g. target temperatures. The time series of readings/values comprises equally spaced values, here one every minute.

The setpoint data and sensor data are generally in the form of a time series of readings over a training time period. Each of the plurality of training data sets preferably relate to a training time period of the same (or at least similar) length, for example the lengths of the time periods do not vary by more than 20% or more than 30%. The training time period in this case is one day (24 hours).

In some cases training data is received as continuous data values and the method 200 further comprises storing the data values and dividing the received data values into training data sets that each relate to (roughly) equal training time periods.

The training data set may also comprise other data, such as the operational state of one or more components in the environmental control system. The operational state data can relate to whether a component/appliance is activated, and may be a binary indication, e.g. a status flag of "On" or "Off". Alternatively, the operational state data may be a binary message stream of control data, from which it is possible to infer whether the appliance is activated or not.

Alternatively, or additionally, it may be possible to identify an appliance in the environmental control system is active from the setpoint data and sensor data. A difference between the target value of the environmental parameter and the actual sensed value of the environmental parameter can indicate that an appliance arranged to control that environmental parameter is activated. For example, if a setpoint target value for humidity is 52%, but the sensed humidity is 58%, it may be inferred that the dehumidifier is activated. Thus the method 200 may also comprise the step of identifying activation states for one or more appliances in each environmental control system from the received training data set.

At step 204, an efficiency category of the environmental control system is identified for each training data set. The efficiency category is selected from one of a plurality of categories. In this example the efficiency category is a numerical scale. Here, the numerical scale is an index from 1 to 5, with 1 being the most efficient and 5 being the least efficient.

Identifying an efficiency category for each training data set can comprise receiving diagnostic data from the environmental control system. For example, the diagnostic data may include performance and efficiency data for each of one or more HVAC components in the environmental control system. Diagnostic data may be provided by smart appliances in the environmental control system that can record and report data relating to their performance or efficiency and/or any faults. For example, these appliances are connected via wireless communication to the HVAC monitoring device 110, to which the appliance send the diagnostic data. The HVAC monitoring device 110 can then send this information to the server 180, via the Internet.

Identifying an efficiency category may additionally, or alternatively, take into account energy consumption of the environmental control system over the training period. Energy consumption may be electricity, gas or oil consumption. Energy consumption data may be measured by a utility meter, such as a gas or electricity meter, or by a smart plug, which can track electricity consumption through the plug. The energy consumption could be the energy consumption of one or more of the HVAC appliances in the environmental control system. Systems with greater energy consumption may generally be held to be less efficient than systems which achieve the same or similar results with lower energy consumption.

Identifying an efficiency category may additionally, or alternatively, be based on external conditions in the vicinity of the premises, such as the outside temperature and/or humidity. For example, a heating system may have to be activated for longer to keep the temperature at the setpoint if it is cold outside, but this does not necessarily mean the HVAC system is inefficient. Thus step 204 may include receiving data relating to external environmental conditions. The data relating to external environmental conditions may be sensor data measured by one or more sensors outside or nearby the premises. These sensors may be in communication with the HVAC monitoring device 120, to which they send the sensor data. The HVAC monitoring device 120 can then send the data to the central server 180 for analysis. Alternatively, the data relating to external environmental conditions could be retrieved from a remote service, for example a web-based weather forecasting service.

In some embodiments the efficiency category for each training data set may be assigned by a human operator. In order for the human operator to assess the efficiency of the system, a visual representation (e.g. a graph) of the training data set may be displayed to the human operator, e.g. on a personal device such as a computer, tablet or smartphone. A plurality of selectable options corresponding to the possible efficiency categories may be presented to the user alongside the visual representation. The step 204 of identifying a category for each training data set can include receiving a user input indicative of the efficiency category of the HVAC system, such as detecting a user has selected one of the plurality of selectable options presented. The user input may be via a user interface element, such as a computer mouse, a keyboard or a touchscreen.

Figure 4:
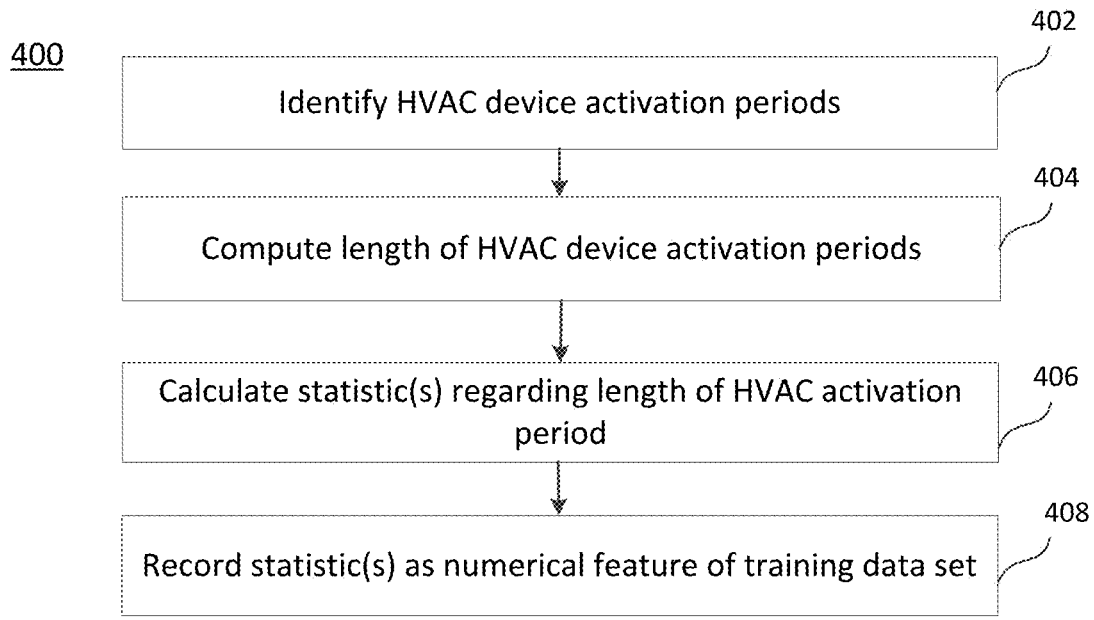
FIG. 4 shows an example method for computing numerical features of a data set.

In step 206, one or more numerical features are computed for each training data set. FIG. 4 shows an example method 400 for computing a numerical feature, which may be performed as part of step 206.

Computing numerical features here comprises identifying 402 HVAC device activation periods in the training time period. The HVAC device activation periods may be identified by control signals, such as "On" and "Off" signals for the HVAC devices that are duplicated to the analysis server 180. Alternatively or additionally, the setpoint data and sensor data can be used to identify appliance activation period. If there is a difference between the target value of the environmental parameter and the actual sensed value of the environmental parameter this can indicate that an appliance arranged to control that environmental parameter is activated. For example, if a setpoint target value for humidity is 52%, but the sensed humidity is 58%, it may be inferred that the dehumidifier is active. Thus step 206 may comprise identifying activation periods for one or more appliances in each environmental control system from the received training data set. An activation period preferably refers to the time for which the environmental control system, or a component thereof, is in operation to alter or maintain the environmental characteristic. An activation period may also be referred to as an "operational period". An activation period is thus a period of time for which the appliance or device is continuously active.

Once the activation periods have been identified, the length of each HVAC appliance activation period is computed at step 404. This computation may involve identifying the start and end points of the activation period (or activation and deactivation times of the appliance) and calculating the intervening time.

Following computing the length of the activation periods, at step 406 one or more statistics about the length of the HVAC activation periods are detected. In this case the length of the longest activation period is identified, along with the average (mean) length of the activation period. Other statistics, such as the median length of activation period and the shortest length of activation period could also be computed.

At step 408 the computed statistics are recorded as numerical features of the training data set.

Figure 5:
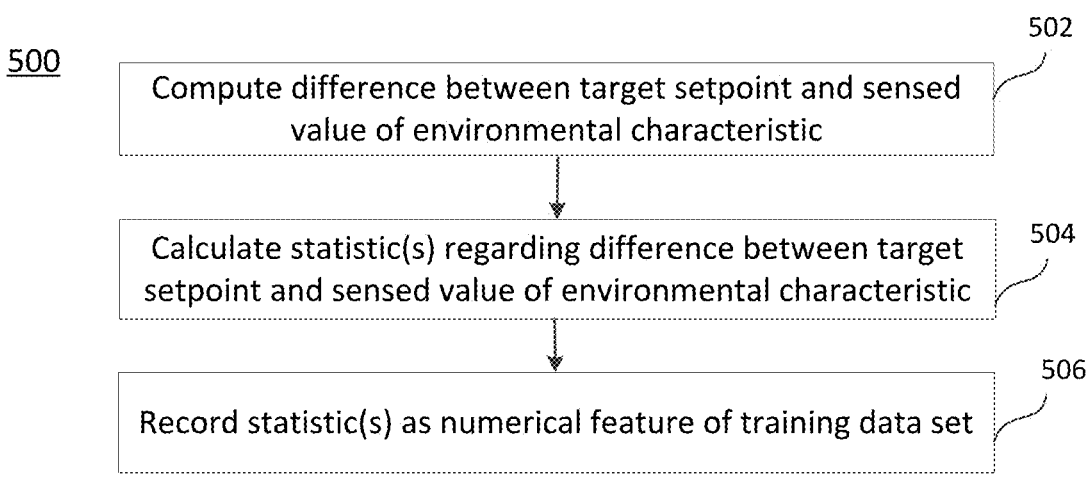
FIG. 5 shows another example method for computing numerical features of a data set.

FIG. 5 shows another example method 500 for computing a numerical feature, which may be performed as part of step 206 (e.g. additionally or alternatively to method 400 of FIG. 4).

At step 502 the difference between the target setpoint and the corresponding sensed value of the environmental characteristic are computed from the sensor data and the setpoint data.

At step 504, statistics relating to the difference between the target setpoint and corresponding sensed value of the characteristic are computed. In this case the mean value of the difference between the setpoint and the value of the environmental characteristic over the training period is calculated and the minimum difference between the setpoint and the value of the environmental characteristic in the training period is also identified. Other statistics, such as the median difference and maximum difference could also be computed.

At step 506 the computed statistics are recorded as numerical features of the training data set.

Figure 6:
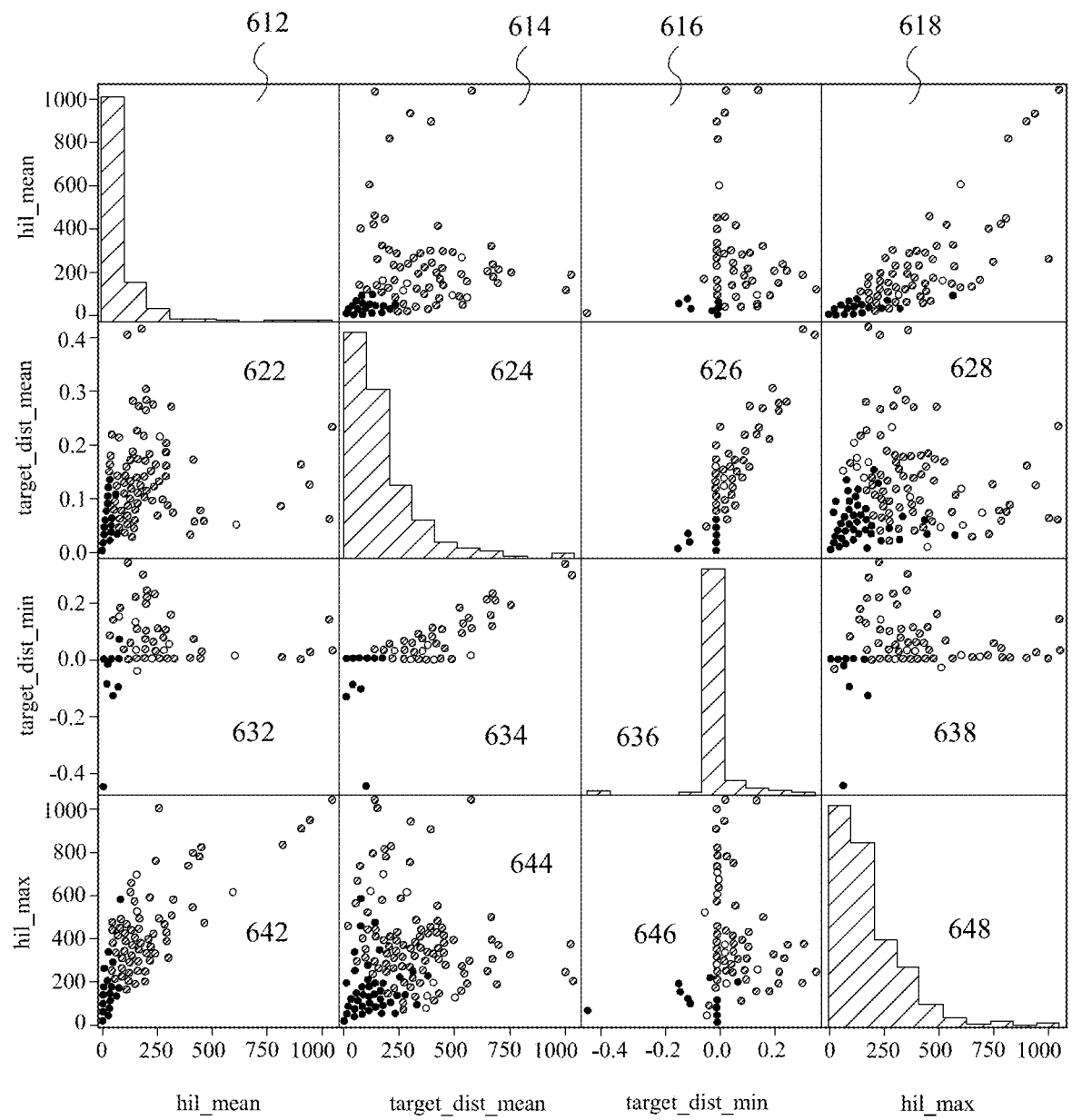
FIG. 6 shows graphs illustrating interdependence between various numerical features.

FIG. 6 shows graphs of correlations between the numerical features themselves for a plurality of data sets. The data sets used to create the plots of FIG. 6 have been created from data recorded about a plurality of heating systems in houses. Each point on each graph represents a data set from a training period (here, one day) in a house. Numerical features relating to the length of the heating periods (e.g. the length of time the boiler is switched on to increase the temperature in the house) and the difference between the target temperature and the recorded room temperature are shown. The room temperature may, for example, have been recorded on a thermostat.

The graphs 612, 622, 632, 642 in the first column show the mean length of heating periods on the horizontal axis (x-axis), measured in minutes.

The graphs 614, 624, 634, 644 in the second column show the mean difference between the target temperature and the measured temperature on the horizontal axis (x-axis), measured in degrees Celsius.

The graphs 616, 626, 636, 646 in the third column show the minimum difference between the target temperature and the measured temperature during the period relating to the data set on the horizontal axis (x-axis), measure in degrees Celsius. It can be seen that whilst a large proportion of the minimum difference values are zero (indicating the measured room temperature reached the target temperature at some stage during the training period), quite a few values are positive, between 0.0° C. and 0.4° C. (actual room temperature is less than target temperature; i.e. the target is never reached), and very few are negative (actual room temperature has exceeded target temperature), between 0.0° C. and −0.5° C.

The graphs 618, 628, 638, 648 in the fourth column show the length of the longest heating period on the bottom horizontal axis (x-axis), measured in minutes.

The graphs 612, 624, 636, 648 on the diagonal show a frequency distribution of data in each interval shown on the y-axis. Graph 612 shows the distribution of mean length of heating periods. As can be seen from the graph 612, the majority of data sets have a mean length of heating period below around 250 minutes. However a few data sets have a mean heating period of around 1000 minutes (over 16 hours). Graph 624 shows the distribution of the mean difference between the target temperature and the measured room temperature. As can be seen, in the majority of cases the mean difference is less than 0.1° C. Graph 636 shows the distribution of the minimum difference between the target and actual temperature. A very large proportion of the minimum differences is around zero Celsius, indicating that for most heating systems the target setpoint is reaches at some point in the training period; a few are positive differences (actual temperature never quite reaches setpoint) and a very few are negative (actual temperature exceeds setpoint). In graph 648 the distribution of the longest length heating periods in the data set is shown. It can be seen that for most training periods the longest heating period is below 250 minutes. A few training periods have longest heating periods between 250 and 500 minutes. Very few training periods have longest heating periods between 500 and 1000 minutes.

The graphs 614, 616, 618 along the top row show the mean length of heating periods on the left-hand, vertical axis (y-axis), measured in minutes.

The graphs 622, 626, 628 on the second row show the mean difference between the target temperature and the measured temperature on the left-hand axis (y-axis), measured in degrees Celsius.

The graphs 632, 634, 638 on the third row show the minimum difference between the target temperature and the measured temperature on the left-hand axis (y-axis), measured in degrees Celsius. Note that whilst the mean difference between the target temperature and the measured temperature (second row) is always positive for these data sets, the minimum difference between the target temperature and the measured temperature (third row) is sometimes negative (e.g. the room temperature is above the target temperature).

The graphs 642, 644, 646 on the fourth row show the length of the longest heating period on the left-hand vertical axis (y-axis), measured in minutes.

Returning to method 200 of FIG. 2, in step 208 a measure of the dependence of the efficiency category identified in step 204 on the numerical features calculated in step 206 is determined.

Figure 7:
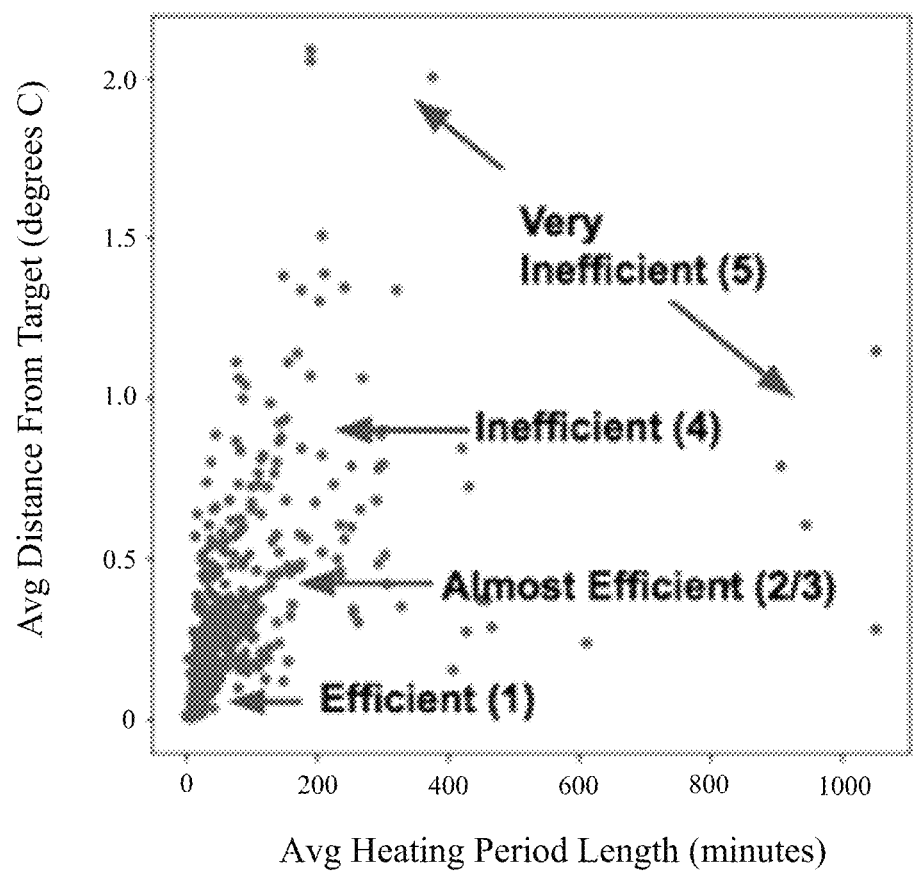
FIG. 7 shows dependence between efficiency category and two different numerical features.

FIG. 7 shows dependence of average length of heating periods and average distance from the target setpoint, on which arrows denoting efficiency categories have been overlaid. The average difference between the target and actual temperatures is plotted on the vertical, y-axis and the average heating period length is plotted along the horizontal, x-axis. Annotations of efficiency categories between 1 (efficient) and 5 (very inefficient) show that heating systems with short heating periods (e.g. less than 200 minutes, preferably less than 100 minutes) and a temperature close to the target (e.g. within 0.5 degrees, preferably within 0.25 degrees) are considered efficient, whilst heating systems with long heating periods (e.g. more than 500 minutes, or even more than 400 minutes) and/or recorded temperatures far from the setpoint (e.g. greater than 1.0° C., or even greater than 0.5° C.) are considered inefficient.

The method 200 then continues to step 210, in which a model for assigning an efficiency category to a monitored HVAC system is created. The model is based on the measure of dependence between the identified category and numerical features for the data sets. The model may be a regression model, for example a linear regression model or a non-linear regression model. Machine learning techniques may be used to create the model.

Figure 8:
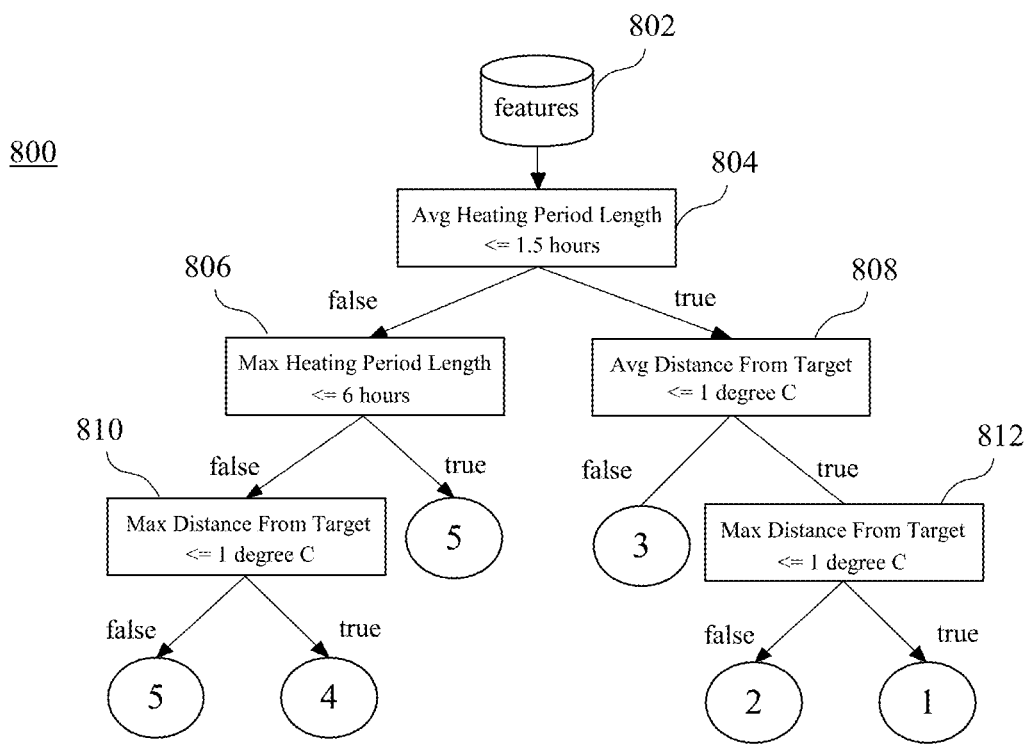
FIG. 8 shows an example of a regression model based on a decision tree.

In FIG. 8 an example of a possible regression model 800 base on a Decision Tree is presented and is described in more detail below. In this case, the training process generates the rules in the tree based on the numerical data and categories.

Although one particular model is shown in FIG. 8, other models are possible. Many regression models exist and the training process is different for each of them. For example, other regression models may use a weighted score to provide a prediction of the efficiency category. Each numerical feature may be given a weighting, e.g. a coefficient. Such a possible regression model may for example be given by the following formula:

> Heating System Efficiency Rating=Average Heating Period×$C1$+Maximum Heating Period×$C2$+Average Difference between Measured Temperature and Target Temperature×$C3$+Maximum Difference Between Measured Temperature And Target Temperature×$C4$ In this case the features are weighted by the coefficients $C1$, $C2$, $C3$, $C4$ then summed together to obtain an estimation of the rating index. For this model, the training process comprises determining coefficients for each of the numerical features that provide a best fit of the training data to the assigned efficiency categories.

In preferred embodiments, a Random Forest is used as the model, comprising a plurality of decision trees. Decision trees sometimes learn highly irregular patterns and thus can "overfit" their training sets, e.g. have low bias, but very high variance. By using a random forest it may be possible to average multiple decision trees that are trained on different parts of the same training set, and thus reduce the variance and arrive at an improved result.

The model created in step 210 can be used for assigning efficiency categories to one or more monitored HVAC systems.

Although the training time period here is one day, other training time periods are envisaged, such as 12 hours, six hours or four hours, or even two days, three days or seven days (one week). Preferably the training time period is at least four hours and not more than three days, more preferably at least 12 hours and not more than two days. Generally the training time period is predetermined.

In other embodiments, the time series of data may have different time intervals between the readings. Preferably time intervals between readings are at least 3 seconds and not more than 30 minutes, more preferably at least 5 seconds and not more than 10 minutes, more preferably between around 10 seconds and 1 minute.

Although the efficiency category is described above as being selected from one of five categories, in alternative embodiments there are more or fewer possible efficiency categories to select from. Preferably the efficiency category is selected from at least two and not more than 20 possible categories, more preferably from at least three and not more than 10 possible categories.

Although the efficiency categories described above are numerical, in other embodiments the efficiency categories may be different, e.g. based on letters (such as: A, B, C, D, . . . H, I, J, where A is the most efficient and J the least), or the categories may be purely qualitative, e.g. having labels such as "very efficient", "fairly efficient", "moderately efficient", "moderately inefficient", "fairly inefficient", "faulty" and/or "completely broken".

Figure 3:
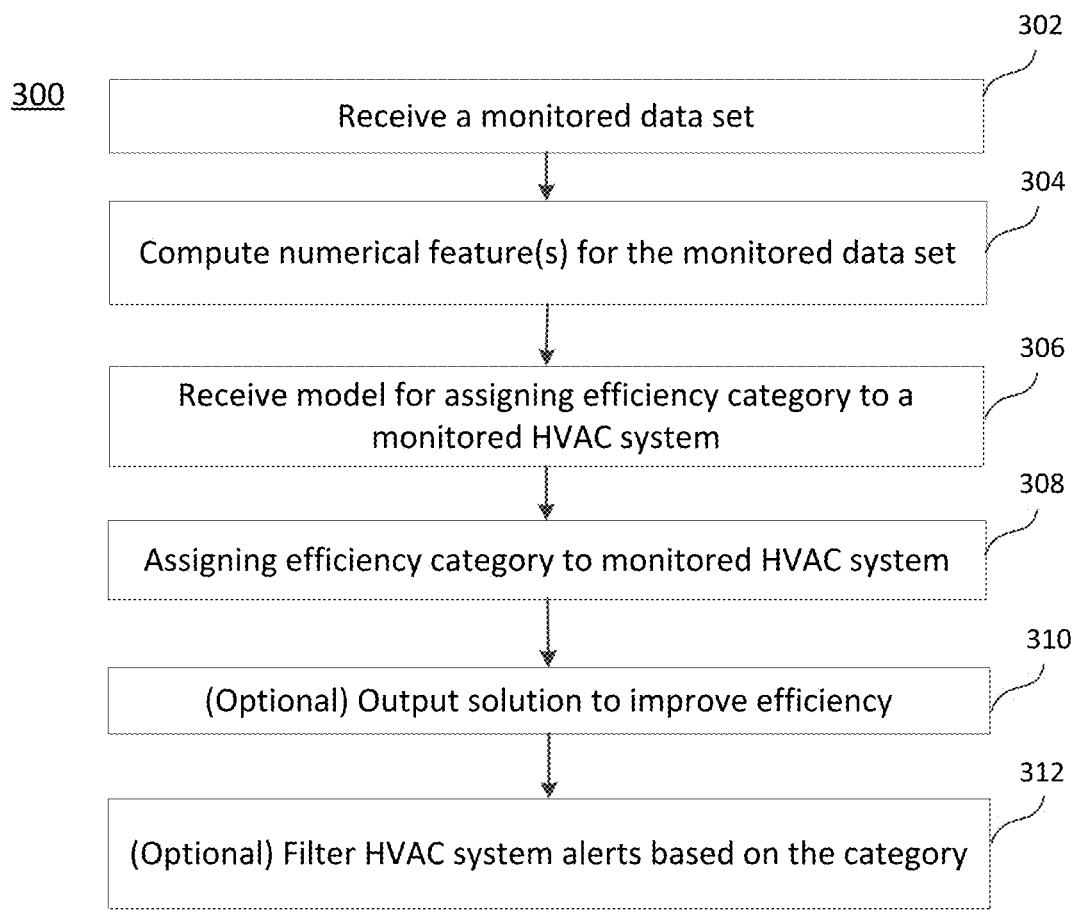
FIG. 3 shows an example method for assigning an efficiency category to an HVAC system using a model.

FIG. 3 shows a method 300 for assigning efficiency categories to monitored HVAC systems automatically based on a model, such as a model created by the method 200 shown in FIG. 2. The method 300 may be performed at a device associated with the premises, for example at HVAC monitoring device 110 shown in FIG. 1, or at user device 190 or user device 192. In some embodiments the method 300 can be performed at a remote server, which may receive data from and assign efficiency categories to a plurality of HVAC systems. For example, method 300 may be performed at analysis server 180.

In step 302 a monitored data set is received. This data set comprises data collected from an HVAC system at a monitored premises over a monitoring time period, for example one day. The HVAC system may be a system such as system 100 shown in FIG. 1. The monitored data set includes setpoint data (e.g. derived from a control schedule) and sensor data (measured at the premises by one or more sensors) for at least one environmental characteristic controlled by the HVAC system, e.g. temperature, humidity.

As with the training data set, the time series of readings/values in the monitored data set can comprise equally spaced values, here one every minute. The setpoint data and sensor data are generally in the form of a time series of readings over a monitored time period. Each monitored data set preferably relates to a monitored time period of the same (or at least similar) length to those of the training data sets used to train the model, for example the lengths of the time periods do not vary by more than 20% or more than 30% from the training time periods. Thus in this case the monitored time period is one day (24 hours).

In some cases the monitored data is received as continuous data values and the method 300 further comprises storing the data values and dividing the received data values into monitored data sets. Preferably dividing into monitored data sets happens as data is received, e.g. each time a monitoring time period elapses a new monitored data set is created, such as at midnight each day for the preceding 24 hours.

As with the training data sets, the monitored data set may also comprise other data, such as the operational state of one or more components in the monitored environmental control system. The operational state data can relate to whether a component/appliance is activated, and may be a binary indication, e.g. a status flag of "On" or "Off". Alternatively, the operational state data may be a binary message stream of control data, from which it is possible to infer whether the appliance is activated or not.

Alternatively, or additionally, it may be possible to identify an appliance in the environmental control system is active from the setpoint data and sensor data. A difference between the target value of the environmental parameter and the actual sensed value of the environmental parameter can indicate that an appliance arranged to control that environmental parameter is activated. For example, if a setpoint target value for humidity is 52%, but the sensed humidity is 58%, it may be inferred that the dehumidifier is activated. Thus the method 300 may also comprise the step of identifying activation states for one or more appliances in the monitored environmental control system from the received monitored data set.

Although the monitoring time period here is one day, other monitoring time periods are envisaged, such as 12 hours, six hours or four hours, or even two days, three days or seven days (one week). Preferably the monitoring time period is at least four hours and not more than three days, more preferably at least 12 hours and not more than two days. Generally the monitoring time period is predetermined. Preferably the length of the monitoring time periods is the same, or at least roughly equal to (e.g. the same to within 10%), the length of the training time periods.

At step 304 numerical features are computed for the monitored data set, for example as described in relation to step 206 of method 200 shown in FIG. 2. Thus one or more numerical features such as average, maximum and minimum lengths of activation periods and average, maximum and minimum differences between target and actual values of environmental characteristics can be found.

At step 306 a model is received for assigning efficiency categories to the HVAC system. The model may have been previously derived from the method 200 described above in relation to FIG. 2. Although here step 306 is performed after step 304, in some embodiments the model may be received prior to step 304 or even prior to step 302.

At step 308 the received model and computed numerical features are used to assign an efficiency category to the monitored HVAC system. The efficiency category will normally be one of a plurality of efficiency categories, as described above, for example a numerical category. The model may be a linear or non-linear regression model.

FIG. 8 shows an example of a possible regression model 800 based on a Decision Tree that may be created as part of step 210 and/or may be used to assign an efficiency category as in step 308. This model 800 takes as input the numerical features shown in FIG. 6 and applies a set of rules in cascade. The output of the model 800 is an efficiency category, here an index from 1 to 5, intended to match the efficiency categories identified for each of the training data sets in step 204.

At 802 the numerical features of a monitored data set can be input, here these are the average (mean) heating period length, the maximum heating period length, the average (mean) difference between the target temperature and the setpoint and the maximum difference from the setpoint.

In the first decision 804, a comparison is made as to whether the mean heating period length for that data set is less than or equal to 1.5 hours. If the mean heating period is greater than 1.5 hours, the model proceeds to the second decision 806 and if the mean heating period is less than or equal to 1.5 hours, the model proceeds to the third decision 808.

At the second decision 806 it is determined whether the maximum heating period length is less than or equal to 6 hours. If the maximum heating period is greater than 6 hours, the model proceeds to the fourth decision 810. If the maximum heating period length is less than or equal to 6 hours, this may indicate there are a lot of lengthy heating periods during the monitored time period and so the model designates the heating system is very inefficient and assigns category 5.

In the third decision 808, it is determined whether the average (mean) difference between the room temperature and the target room temperature is less than or equal to 1° C. If the average difference is greater than 1° C. the model designates the heating system as almost efficient and assigns category 3. If in the third decision 808 it is determined that the average difference is less than or equal to 1° C., the model proceeds to the fifth decision 812.

In the fourth decision 810, it is decided whether the maximum difference between the target temperature and the measured temperature is less than or equal to 1° C. If the maximum difference is greater than 1° C., the model designates the heating system as very inefficient and assigns category 5. If the maximum difference between the target temperature and the measured temperature is less than or equal to 1° C., the model designates the heating system as inefficient and assigns efficiency category 4.

In the fifth decision 812, it is decided whether the maximum difference between the target temperature and the measured temperature is less than or equal to 1° C. If the maximum difference is greater than 1° C., the model designates the heating system as almost efficient and assigns category 2. If the maximum difference between the target temperature and the measured temperature is less than or equal to 1° C., the model designates the heating system as efficient and assigns efficiency category 1.

Following the rules we note that short heating periods lead to an index between 1 and 3, while long heating periods result in an index from 4 to 5. This model is in line with the data shown in FIG. 7.

At step 310, if applicable, the category assigned in step 308 may be used to output a solution to improve the efficiency of the monitored HVAC system.

For example, in the case of an inefficient system the efficiency rating of the HVAC system can be notified to a user associated with the HVAC system and solutions to improve the efficiency can be suggested. Such solutions may be notified by sending a message to a device associated with the HVAC system, such as user device 190 or 192 shown in FIG. 1, or could be sent to/shown on the HVAC controller/ thermostat 120 or HVAC monitoring device 110. The message generally includes the HVAC efficiency rating. In one example, the improvements to the insulations and/or the replacement boilers of the boiler could be suggested.

Outputting a solution can additionally or alternatively involve adjusting one or more settings of the HVAC system to improve the efficiency of the Adjusting the one or more settings may be performed automatically upon identifying the efficiency category. In alternative embodiments, the adjusting the one or more settings may comprise presenting an option to alter the settings to a user, e.g. via a message to a device associated with the HVAC system, such as user device 190 or 192 shown in FIG. 1, or could be shown on the HVAC controller/ thermostat 120 or HVAC monitoring device 110. The message could display one or more settings to alter and could comprise a user-selectable option to allow the user to select the input. Thus the step of outputting a solution may further comprise receiving a user input approving altering the one or more settings and adjusting the one or more settings upon receiving the user input. Settings that could be adjusted include setpoint values for one or more environmental parameters (e.g. target temperature, highest temperature, lowest temperature, humidity) and/or the duration of setpoint values. For example, if a user requests too high a setpoint value which makes a heating system inefficient, adjusting the setting(s) may comprise reducing the setpoint value.

Adjusting the one or more settings can comprise sending a control message to an HVAC controller, such as thermostat 120, to cause the one or more settings to be adjusted.

Alternatively or additionally, the method 300 may further include the step 312 of filtering HVAC system alerts based on the efficiency category. For example, where a diagnostic system is used to identify possible faults in the HVAC system, the efficiency category can be used to improve such identification. In some embodiments, where the efficiency category shows the system is inefficient, alerts from the diagnostic system may be suppressed (e.g. not notified to a user) since models used for HVAC diagnostics can often create false alerts during inefficient periods (e.g. user requested setpoint that is too high/unachievable, or where premises is not sufficiently insulated and/or external temperature is far from setpoint). In other words, after generating an alert the alert may be discarded if the efficiency category satisfies one or more criteria. Thus filtering HVAC alerts may comprise comparing the efficiency category to a predetermined alert suppression threshold. Preferably diagnostic alerts would be suppressed only for a predetermined period of time, for example to avoid constant suppression when there really is a fault that exhibits characteristics of an inefficient system. The predetermined time period may relate to an integer number of monitoring periods, e.g. at least three monitoring periods or at least five monitoring periods. Preferably the suppression time period is at least one day and not more than 20 days, more preferably at least two days and not more than 10 days, more preferably at least three days and/or not more than five days.

Preferably, where there is an HVAC diagnostic system, data from periods in which a diagnostic alert is generated is not used as training data to create a model for assigning a category.

Figure 10:
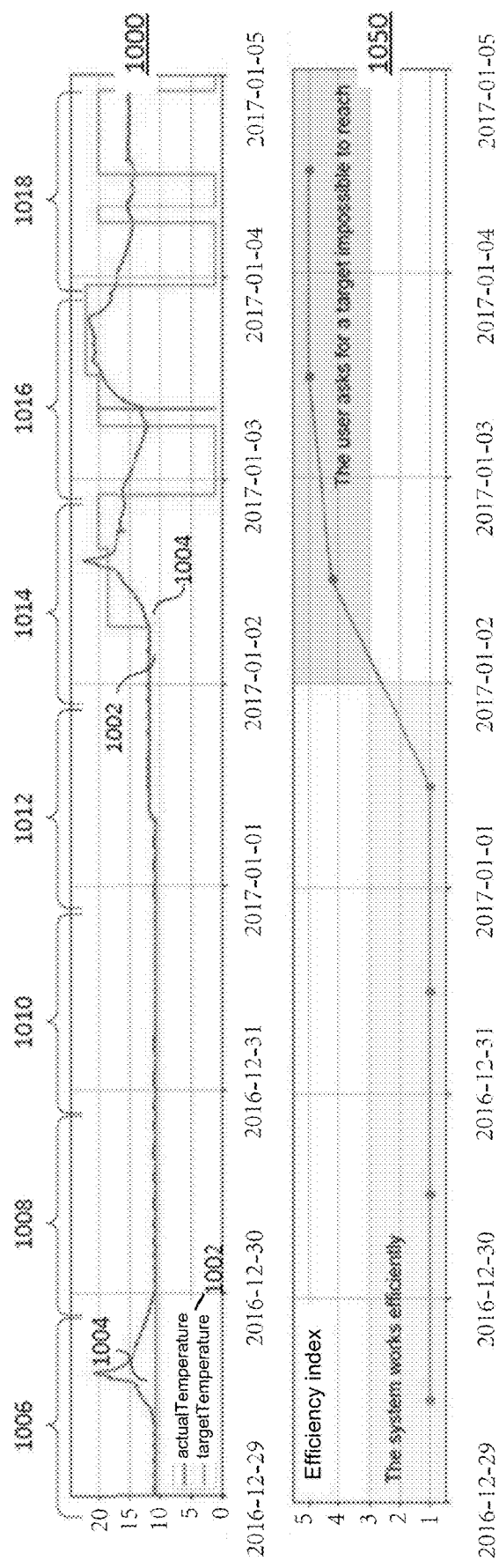
FIG. 10 shows a plurality of example data sets.

FIG. 10 shows a plurality of example data sets relating to a heating system at a single premises on consecutive days. These could be examples of monitored data sets or of training data sets. The top graph 1000 shows a first plot 1004 of the setpoint data and a second plot 1004 of recorded sensor data. Below the plots of the sensor data and setpoint data, the lower graph 1050 shows the efficiency index for each data set, which is an integer from 1 to 5.

As mentioned above in relation to method 200 of FIG. 2, once setpoint data and sensor data relating to a system, such as the data shown in FIG. 10, is received, the method 200 may comprise dividing or isolating the received data into individual training data sets, for example where each data set relates to a predetermined time period, such as a training time period. In this case the predetermined time period is one day and data from a single day is isolated as a single data set.

A first data set relates to data recorded during a first time period 1006, which is the day of 29 Dec. 2016. Here the setpoint 1002 is 11° C. and the actual recorded temperature 1004 remains very close to the setpoint 1002 until around the middle of the first time period 1006. For roughly the first half of the first time period 1006 the recorded sensor data shows the temperature oscillating around the setpoint 1002. For some reason, there is a large spike as the temperature 1004 rises above the setpoint 1002. However as this is a heating system (e.g. there is no air conditioning unit), this would not result in activation of the environmental control system. Therefore the temperature is maintained within or close to the desired range (designated by the setpoint) fairly easily and the efficiency category shown in the second graph 1050 is 1 (efficient).

Second and third data sets recorded during a second time period 1008 and a third time period 1010 on the 30 Dec. 2016 and 31 Dec. 2016 show the measured temperature 1004 staying close to the target temperature 1002, which is still at 11° C. Therefore the efficiency category shown in the second graph 1050 is 1 (efficient) for the second and third data sets.

A fourth data set relates to the fourth time period 1012, which is 1 Jan. 2017. During the fourth time period 1012 the setpoint 1002 is increased to 12° C. The setpoint increase is followed quickly (e.g. within 20-30 minutes) by an increase in the temperature 1004 to 12° C. Thus the efficiency category is also maintained at 1 (efficient) for the fourth data set.

A fifth data set relates to the fifth time period 1014, which is 2 Jan. 2017. During the fifth time period 1014 the setpoint 1002 is increased to 18° C. The setpoint increase is followed fairly slowly (e.g. over about 5 to 8 hours) by an increase in the temperature 1004 to 18° C. Thus the heating is required to be on for a very long period of time to achieve the desired setpoint. Later during the fifth time period 1014 the setpoint 1002 is increased to 20° C., but the temperature 1004 continues to drop and the setpoint 1002 is not achieved, even after several hours. Therefore the efficiency category is now changed to 4 (inefficient) for the fifth data set.

A sixth data set relates to the sixth time period 1016, which is 3 Jan. 2017. During the sixth time period 1016 the setpoint 1002 is increased to 20° C. and then to 22° C. The temperature 1004 does increase, but even over a few hours does not reach either of these setpoints. Therefore the efficiency category is now changed to 5 (very inefficient) for the sixth data set.

A seventh data set relates to the seventh time period 1018, which is 4 Jan. 2017. During the seventh time period 1018 the setpoint 1002 is set at 20° C. for two periods of time. However during these periods the temperature 1004 remains fairly constant at around 15° C. Therefore the efficiency category is maintained at 5 (very inefficient). The difference between the setpoint 1002 and the actual temperature 1004 is substantial for much of the seventh time period 1018.

From day five onwards, the user has set a target temperature that is impossible (or at least very difficult) for the heating system to reach and therefore the system becomes inefficient.

Figure 11:
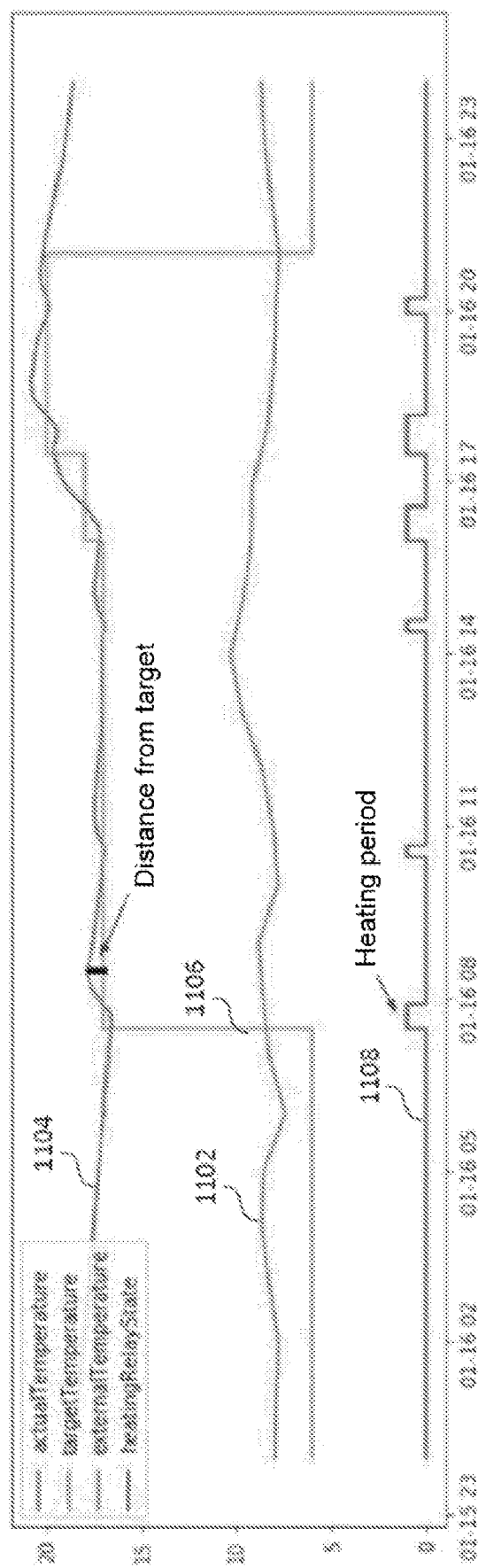
FIG. 11 shows a further example data set.

FIG. 11 shows another example data set, which could be a training data set or a monitoring data set as described above. The data set is recorded during the 24-hour time period of 16 Jan. 2016. The data set includes sensor data and setpoint data for an environmental condition controlled by an HVAC system. The environmental condition is the temperature within a premises controlled by a heating system. These are shown by plot 1104 of the actual recorded temperature in the premises and plot 1106 of the target setpoint temperature in the premises. In addition, further sensor data, being an external temperature 1102 recorded by a sensor in the vicinity of the premises, and a heating relay signal 1108 from the heating system, which is binary, on (1) or off (0).

As can be seen from FIG. 11, whenever the actual temperature 1104 is below the target setpoint 1106 the heating system is switched on, or activated, e.g. just before 8 am. The heating system is then deactivated once the setpoint temperature is achieved. This heating system appears fairly efficient since the heating periods are small and the actual temperature remains near, or above, the target temperature for the entire period.

Figure 9A:
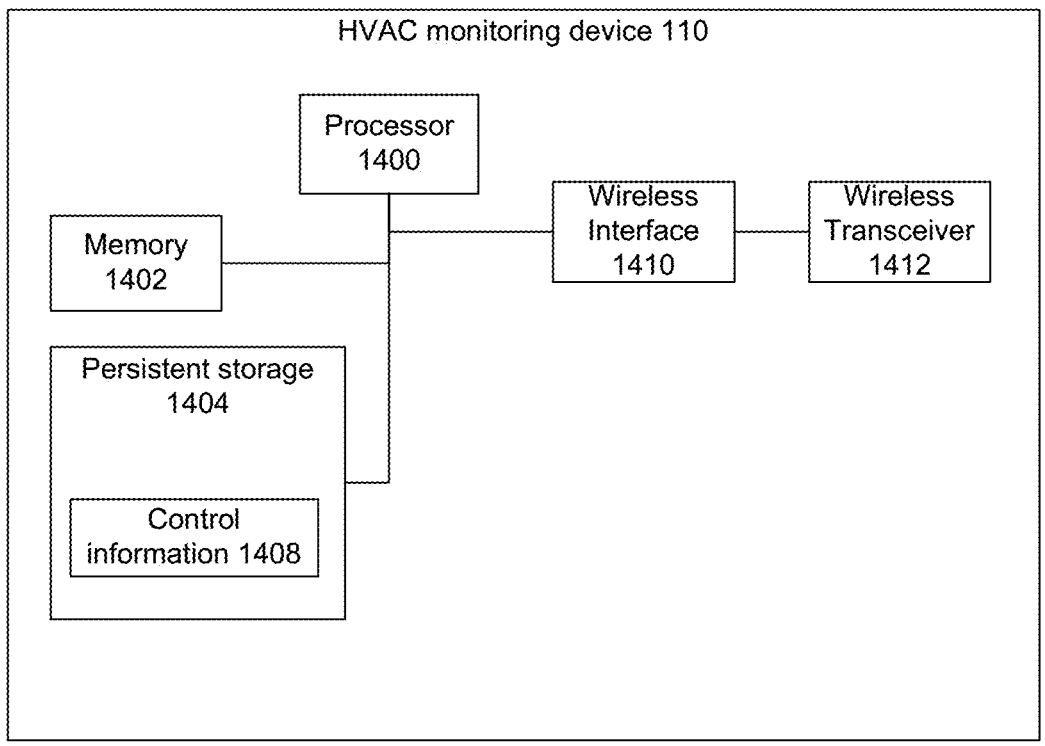
FIG. 9A shows an example HVAC monitoring device.

FIG. 9A illustrates a hardware architecture of the HVAC monitoring device 110 that may be provided for monitoring an environmental control system, in conjunction with an HVAC controller (e.g. thermostat). The HVAC monitoring device 110 includes a processor 1400 together with volatile/random access memory 1402 for storing temporary data and software code being executed. Random access memory 1402 may be used to store data from environmental sensors (e.g. temperature data). Persistent storage 1404 may store control information 1408, including the control schedule(s) programmed by the user into the HVAC controller 120 (see FIG. 1). Persistent storage 1404 may include other software and data, such as an operating system, device drivers, software configuration data, historical temperature measurement data, and the like.

The control schedules may be received from the HVAC controller 120 or from the wireless receivers 130, 132, 134 (FIG. 1). In this case (the control schedules not being stored in the HVAC monitoring device 110), the HVAC monitoring device 110 may receive a message from one of the receivers 130, 132, 134 or from the HVAC controller 120 when the HVAC components are switched on or off. This message may also include some details of the environmental control schedule (e.g. what the target temperature or humidity is) so that only temporary copies of the information are stored at the thermostat (e.g. in memory 1402).

Communication with the wireless receivers 130, 132, 134, the HVAC controller 120 and the sensors 112, 114 (FIG. 1) occurs via a wireless network interface 1410 and wireless transceiver 1412.

Environmental sensors 112, 114 (FIG. 1) measure the ambient temperature and humidity and provide the environmental characteristic information to HVAC monitoring device 110 via the wireless transceiver 1412 and the wireless interface 1410. This information is passed to the processor 1400, which stores the information in memory 1402 and/or persistent storage 1404 for use in controlling the heating system.

As explained above, in some embodiments the sensors may be incorporated into the HVAC monitoring device.

The device components are interconnected by a data bus (this may in practice consist of several distinct buses such as a memory bus and I/O bus).

While a specific architecture is shown, any appropriate hardware/software architecture may be employed. For example, external communication may be via a wired network connection.

As mentioned above, instead of being provided separately as an additional "Internet of Things" component and linked into the smart thermostat ecosystem via the wireless local area network (WLAN) at the premises the HVAC monitoring device 110 could be embedded within a smart thermostat (HVAC controller 120).

Figure 9B:
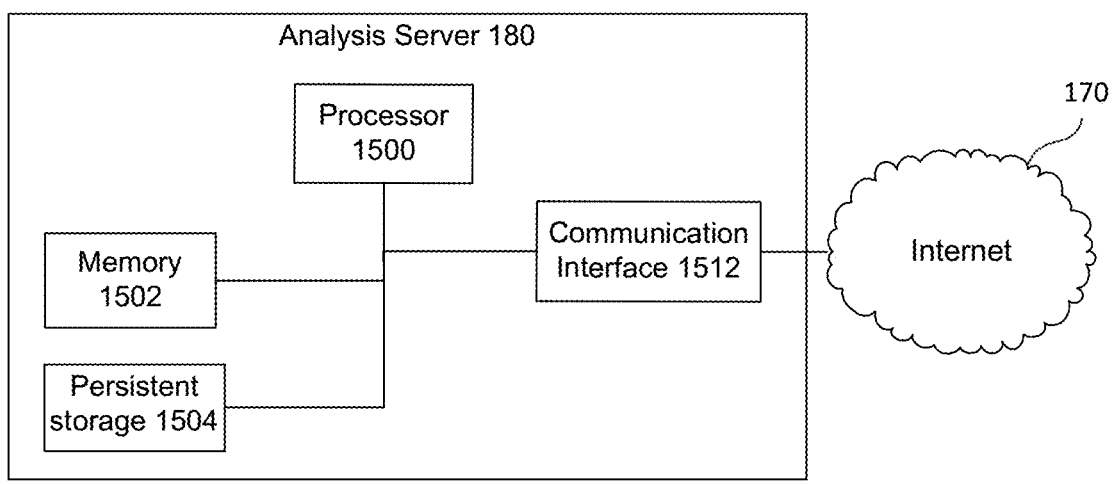
FIG. 9B shows an example analysis server.

FIG. 9B illustrates a hardware architecture of the remote datacentre (analysis server 180) shown in FIG. 1. The analysis server 180 comprises at least one communication interface 1512 for connection with the Internet 170. Via the connection with the Internet 170, the remote datacentre 180 can communicate with HVAC monitoring devices 110 (FIG. 1) in numerous different premises.

The analysis server 180 includes a processor 1500 together with volatile/random access memory 1502 for storing temporary data and software code being executed. Random access memory 1502 may be used to store data temporarily (for example the rolling log of data from environmental sensors in embodiments in which the sensor data for the log is continuously sent to the analysis server 180 from the HVAC monitoring devices 110).

Persistent storage 1504 (e.g. in the form of disk storage or FLASH memory) may persistently store control information, such as logic for analysing environmental data.

While a specific architecture is shown, any appropriate hardware/software architecture may be employed. For example, external communication may be via a wired network connection. The above embodiments and examples are to be understood as illustrative examples.

Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

Aspects of the apparatus and methods described herein are further exemplified in the following numbered CLAUSES:

1. A method of building a model for detecting inefficiencies in environmental control systems, each arranged to control at least one environmental characteristic at a premises, the method comprising:
    receiving a plurality of training data sets for one or more environmental control systems, each training data set comprising setpoint data and sensor data for an environmental characteristic at a premises controlled by an environmental control system over a training time period;
    identifying a category for each training data set indicative of the efficiency of the environmental control system over the training time period;

computing one or more numerical features for each training data set based on the setpoint data and sensor data;

determining a measure of dependence between the identified category and the computed one or more numerical features; and creating a model based on the determined measure of dependence, wherein the model is configured to assign a category indicative of the efficiency of a monitored environmental control system based on a monitored data set comprising setpoint data and sensor data for an environmental characteristic at the premises controlled by the monitored environmental control system over a monitoring time period.

2. A method according to any preceding clause, wherein the plurality of training data sets comprises at least 30 training data sets, preferably at least 50 training data sets, more preferably at least 100 training data sets.

3. A method according to any preceding clause, wherein the step of identifying a category comprises outputting to a human operator a visual representation of each of the training data sets; and receiving an input from the human operator indicative of the category.

4. A method according to any preceding clause, wherein the step of identifying a category comprises:

receiving diagnostic data relating to the operation of one or more appliances in the environmental control system during the training time period; preferably said diagnostic data being recorded by an appliance monitoring device at the premises, or wherein the appliance is a smart appliance and the diagnostic data is reported by the appliance itself.

5. A method according to any preceding clause, wherein the step of identifying a category comprises:

receiving utility consumption data for the environmental control system; for example gas, oil or electricity consumption data.

6. A method according to any preceding clause, further comprising:

receiving a monitored data set comprising setpoint data and sensor data for a monitored environmental characteristic over a monitoring time period;

computing one or more numerical features for the monitored data set based on the setpoint data and sensor data; and assigning a category indicative of the efficiency of the monitored environmental control system based on the created model and the one or more numerical features of the monitored data set.

7. A method of detecting inefficiencies in a monitored environmental control system arranged to control at least one environmental characteristic at a premises, the method comprising:

receiving a monitored data set comprising setpoint data and sensor data for an environmental characteristic over a monitoring time period;

computing one or more numerical features for the monitored data set based on the setpoint data and sensor data;

receiving a model for detecting inefficiencies in environmental control systems, the model relating efficiency of environmental control systems to numerical features derivable from a data set comprising setpoint data and sensor data for an environmental characteristic controlled by environmental control systems; and assigning a category indicative of the efficiency of the monitored environmental control system based on the received model and the one or more numerical features of the monitored data set.

8. A method according to clause 0, wherein the received model is created according to the method of clause 1.

9. A method according to any preceding clause, wherein each data set further comprises external environmental characteristic data relating to the environmental characteristic external to the premises; preferably measured by a sensor in the vicinity of the premises.

10. A method according to clause 0, wherein at least one of the one or more numerical features is based on the external environmental characteristic data.

11. A method according to any preceding clause, wherein each data set further comprises control signal data for one or more appliances of the environmental control system, preferably wherein at least one of the one or more numerical features is based on the control signal data.

12. A method according to any preceding clause, further comprising:

receiving a time series of setpoint values and sensor values for an extended time period;

dividing the extended time period into one or more regular, predetermined time slots to develop one or more data sets of setpoint values and sensor values, each data set corresponding to one of the time slots.

13. A method according to any preceding clause, wherein computing one or more numerical features for a data set based on the setpoint data and sensor data comprises:

identifying one or more activation periods of appliances of the environmental control system for the monitoring or training period;

computing the length of each of the identified one or more activation periods; and using the computed length of each of the activation periods to compute the one or more numerical features for the data set.

14. A method according to clause 0, wherein identifying the activation period comprises detecting the start and/or end of the activation period.

15. A method according to clause 0, wherein one or both of the start and end of the activation period are detected:

in dependence on a control signal used to control the environmental control system; or in dependence on a difference between the setpoint value and a current sensor value of the environmental characteristic.

16. A method according to any preceding clause, wherein computing one or more numerical features for a data set based on the setpoint data and sensor data comprises:

computing the difference between the setpoint for an environmental characteristic and the sensed value of the environmental characteristic during activation periods, and optionally across the whole training or monitoring period.

17. A method according to any preceding clause, wherein the numerical features comprise one or more of:

the largest, mean and median values of the length of one or more activation periods of appliances of the environmental control system in the monitoring or training period.

18. A method according to any preceding clause, wherein the numerical features comprise one or more of:
    a frequency or rate of activation periods of appliances of the environmental control system in the monitoring or training period.
19. A method according to any preceding clause, wherein the numerical features comprise:
    the mean length of activation periods of the environmental control system over the monitoring or training period;
    the length of the longest activation period of the environmental control system in the monitoring or training period;
    the mean of the difference between the setpoint value and the sensor value of the environmental characteristic over the monitoring or training period; and
    the minimum value of the difference between the setpoint value and the sensor value of the environmental characteristic in the monitoring or training period.
20. A method according to any of clauses 0 to 0, wherein the activation period is a heating period for the environmental control system.
21. A method according to any preceding clause, wherein the numerical features comprise one or more of:
    the mean, median, maximum and minimum values of the difference between the setpoint value and the sensor value of the environmental characteristic in the monitoring or training period.
22. A method according to any preceding clause, wherein the model comprises a regression model.
23. A method according to clause 0, wherein the model is a linear regression model.
24. A method according to clause 0, wherein the model is a non-linear regression model.
24. A method according to any preceding clause, wherein the model comprises a decision tree.
26. A method according to any of clauses 0 to 0, wherein the model comprises a random forest, or random decision forest.
27. A method according to any preceding clause, wherein the model comprises one or more rules for assigning a category indicative of the efficiency of the monitored environmental control system based on the numerical features, each rule comprising a threshold value for the numerical feature.
28. A method according to clause 0, wherein each rule provides a first category to assign, or first possible range of categories to assign, when the numerical feature is below the threshold value and a second possible range of categories to assign, or second possible range of categories to assign, when the numerical feature is above the threshold value.
29. A method according to any preceding clause, wherein the one or more numerical features comprise at least two numerical features and wherein the model comprises two or more rules for assigning a category indicative of the efficiency of the monitored environmental control system based on the numerical features.
30. A method according to any preceding clause, wherein the one or more numerical features comprise at least two numerical features and wherein the model comprises a weighting for each of the numerical features for assigning the category.
31. A method according to any of clauses 0 or 0, or any clause dependent thereon, further comprising:
    outputting the assigned category.
32. A method according to any of clauses 0 or 0, or any clause dependent thereon, further comprising:
    identifying a solution based on the assigned category.
33. A method according to clause 0, wherein the solution comprises adjusting the setpoint for the environmental control system.
34. A method according to clause 0, wherein the method further comprises:
    sending a command to the environmental control system to adjust the setpoint in response to identifying the solution.
35. A method according to clause 0, further comprising:
    in response to identifying the solution, providing a message to a user, the message comprising a selectable option to adjust the setpoint; and
    in response to receiving a user selection of the option to adjust the setpoint, sending a command to the environmental control system to adjust the setpoint.
36. A method according to any of clauses 0 or 0, or any clause dependent thereon, further comprising:
    alerting a user associated with the environmental control system in response to assigning a category indicative of an inefficient system, the alerting preferably comprising one or more of:
        displaying an alert on a display associated with the environmental control system; and
        transmitting an alert message to a user device associated with the user, preferably a personal or mobile computing or communications device.
37. A method according to any of clauses 0 or 0, or any clause dependent thereon, comprising, in response to assigning a category indicative of an inefficient system, initiating a test procedure for testing the environmental control system.
38. A method according to clause 0, wherein the test procedure comprises:
    activating the environmental control system, the activating optionally overriding a control schedule active for the monitored environmental control system;
    measuring changes in the environmental characteristic in response to activation of the environmental control system; and
    performing further analysis of measured sensor data relating to the environmental characteristic to identify, quantify and/or classify the underperformance condition.
39. A method according to any of clauses 0 or 0, or any clause dependent thereon, further comprising:
    suppressing or filtering one or more alerts about the monitored environmental control system in response to assigning a category indicative of an inefficient system.
40. A non-transient computer-readable medium comprising instructions which, when executed by a computer, cause the computer to carry out the method of any preceding clause.
41. A monitoring system having means for performing a method as set out in any of the preceding clauses.
42. An analysis server for building a model for detecting inefficiencies in environmental control systems, each arranged to control at least one environmental characteristic at a premises, the server comprising:
    means for receiving a plurality of training data sets for a corresponding plurality of environmental control systems, each training data set comprising setpoint data and sensor data for an environmental characteristic at the premises controlled by the corresponding environmental control system over a training time period;

means for identifying a category for each training data set indicative of the efficiency of the environmental control system over the training time period;

means for computing one or more numerical features for each training data set based on the setpoint data and sensor data;

means for determining a measure of dependence between the assigned category and the computed one or more numerical features; and means for creating a model based on the determined measure of dependence, wherein the model is configured to assign a category indicative of the efficiency of a monitored environmental control system based on a monitored data set comprising setpoint data and sensor data for an environmental characteristic at the premises controlled by the monitored environmental control system over a monitoring time period.

43. A monitoring device or server for detecting inefficiencies in a monitored environmental control system arranged to control at least one environmental characteristic at a premises, the device or server comprising:

means for receiving a monitored data set comprising setpoint data and sensor data for an environmental characteristic over a monitoring time period;

means for computing one or more numerical features for the monitored data set based on the setpoint data and sensor data;

means for receiving or creating a model for detecting inefficiencies in environmental control systems, the model relating efficiency of environmental control systems to numerical features derivable from a data set comprising setpoint data and sensor data for an environmental characteristic controlled by environmental control systems; and means for assigning a category indicative of the efficiency of the monitored environmental control system based on the received model and the one or more numerical features of the monitored data set.

44. A monitoring device or server according to clause 0, further comprising an output for outputting the assigned category.

45. A device or server as set out in any of clauses 0 to 0, arranged to perform or participate in a method as set out in any of clauses 1 to 0.

46. A method, device, server or computer-readable medium according to any preceding clause, wherein the environmental characteristic(s) are each one of: temperature, humidity, pressure, sound.

47. A method, device, server or computer-readable medium according to any preceding clause, wherein the setpoint data comprises a time series of target values for the environmental characteristic, preferably user-selected target values.

48. A method, device, server or computer-readable medium according to any preceding clause, wherein each of the training time period(s) and/or monitoring time period(s) are equal time lengths of predetermined time, for example one day or one week.

49. A method, device, server or computer-readable medium according to any preceding clause, wherein the environmental control system comprises at least one appliance selected from: a boiler; an air conditioning unit; a furnace; a heat pump; a fan; and a dehumidifier.

What is claimed is:

1. A computer-implemented method of controlling a monitored environmental control system arranged to control at least one environmental characteristic at a premises, the method comprising:

receiving a monitored data set comprising setpoint data, control signal data for one or more appliances, and sensor data for an environmental characteristic over a monitoring time period, wherein the setpoint data specifies one or more target values for the environmental characteristic over the monitoring time period, and the sensor data comprises measured values for said environmental characteristic over the monitoring time period;

computing one or more numerical features for the monitored data set based on the setpoint data and sensor data for the environmental characteristic over the monitoring time period, wherein the numerical features comprise a mean activation period for the one or more appliances and a mean difference between the setpoint data and the sensor data;

receiving a model for detecting inefficiencies in environmental control systems, the model relating efficiency of environmental control systems to one or more numerical features derivable from a data set comprising setpoint data, control signal data for one or more appliances, and sensor data for an environmental characteristic controlled by environmental control systems, the one or more numerical features derivable from the data set comprising a mean activation period for the one or more appliances and a mean difference between the setpoint data and the sensor data, wherein the model comprises one or more rules for assigning one of a plurality of efficiency categories indicative of the efficiency of the monitored environmental control system based on the one or more numerical features, each rule comprising a threshold value for one of the one or more numerical features;

assigning an efficiency category indicative of the efficiency of the monitored environmental control system over the monitoring time period comprising inputting to the received model the one or more numerical features of the monitored data set computed based on the setpoint data, the control signal data for one or more appliances and the sensor data for said environmental characteristic over the monitoring time period;

identifying a solution based on the assigned efficiency category, wherein the solution comprises adjusting one or more settings of the environmental control system; and sending a command to the environmental control system to adjust the one or more settings in response to identifying the solution.

2. A method according to claim 1, wherein each data set further comprises external environmental characteristic data relating to the environmental characteristic external to the premises; wherein at least one of the one or more numerical features is based on the external environmental characteristic data.

3. A method according to claim 1, wherein each data set further comprises control signal data for one or more appliances of the environmental control system, and wherein at least one of the one or more numerical features is based on the control signal data.

4. A method according to claim 1, further comprising:

receiving a time series of setpoint values and sensor values for an extended time period; and dividing the extended time period into one or more regular, predetermined time slots to develop one or more data sets of setpoint values and sensor values, each data set corresponding to one of the time slots.

5. A method according to claim 1, wherein computing one or more numerical features for a data set based on the setpoint data and sensor data comprises:
identifying one or more activation periods of appliances of the environmental control system for the monitoring or training period; computing the length of each of the identified one or more activation periods; and
using the computed length of each of the activation periods to compute the one or more numerical features for the data set.

6. A method according to claim 1, wherein computing one or more numerical features for a data set based on the setpoint data and sensor data comprises:
computing the difference between the setpoint for an environmental characteristic and the sensed value of the environmental characteristic during activation periods.

7. A method according to claim 1, wherein the one or more numerical features comprise one or more of:
the largest, mean and median values of the length of one or more activation periods of appliances of the environmental control system in the monitoring or training period; and a frequency or rate of activation periods of appliances of the environmental control system in the monitoring or training period.

8. A method according to claim 1, wherein the model comprises one or more rules for assigning an efficiency category indicative of the efficiency of the monitored environmental control system based on the one or more numerical features, each rule comprising a threshold value for one of the one or more numerical features, wherein each rule provides a first efficiency category to assign, or first possible range of efficiency categories to assign, when the numerical feature is below the threshold value and a second efficiency category to assign, or second possible range of efficiency categories to assign, when the numerical feature is above the threshold value.

9. A method according to claim 1, wherein computing one or more numerical features comprises computing at least two numerical features and wherein the model comprises two or more rules for assigning an efficiency category indicative of the efficiency of the monitored environmental control system based on the numerical features.

10. A method according to claim 1, wherein computing one or more numerical features comprises computing at least two numerical features and wherein the model comprises a weighting for each of the numerical features for assigning the efficiency category.

11. A method according to claim 1, wherein the one or more settings comprises a setpoint for the environmental control system, the method further comprising: in response to identifying the solution, providing a message to a user, the message comprising a selectable option to adjust the setpoint; and in response to receiving a user selection of the option to adjust the setpoint, sending a command to the environmental control system to adjust the setpoint.

12. A method according to claim 1, further comprising:
alerting a user associated with the environmental control system in response to assigning an efficiency category indicative of an inefficient system, the alerting comprising one or more of:
displaying an alert on a display associated with the environmental control system; and transmitting an alert message to a user device associated with the user, the user device being a personal or mobile computing or communications device.

13. A method according to claim 1, comprising, in response to assigning an efficiency category indicative of an inefficient system, initiating a test procedure for testing the environmental control system, wherein the test procedure comprises:
activating the environmental control system, wherein the activating overrides a control schedule active for the monitored environmental control system; measuring changes in the environmental characteristic in response to activation of the environmental control system; and performing further analysis of measured sensor data relating to the environmental characteristic to identify, quantify and/or classify the underperformance condition.

14. A method according to claim 1, further comprising:
suppressing or filtering one or more alerts about the monitored environmental control system in response to assigning an efficiency category indicative of an inefficient system.

15. A method according to claim 1, wherein the model is built by a method comprising the steps of:
receiving a plurality of training data sets for one or more environmental control systems, each training data set comprising setpoint data and sensor data for an environmental characteristic at a premises controlled by an environmental control system over a training time period;
identifying an efficiency category for each training data set indicative of the efficiency of the environmental control system over the training time period; computing one or more numerical features for each training data set based on the setpoint data and sensor data determining a measure of dependence between the identified efficiency category and the computed one or more numerical features; and creating a model based on the determined measure of dependence, wherein the model is configured to assign an efficiency category indicative of the efficiency of a monitored environmental control system based on a monitored data set comprising setpoint data and sensor data for an environmental characteristic at the premises controlled by the monitored environmental control system over a monitoring time period.

16. A method according to claim 15, wherein the step of identifying an efficiency category comprises outputting to a human operator a visual representation of each of the training data sets; and receiving an input from the human operator indicative of the efficiency category.

17. A method according to claim 15, wherein the step of identifying an efficiency category comprises receiving diagnostic data relating to the operation of one or more appliances in the environmental control system during the training time period.

18. A method according to claim 1, wherein computing one or more numerical features comprises detecting one or more of: a start time and an end time of one or more activation periods of appliances of the environmental control system for the monitoring time period in dependence on a difference between the setpoint data and the sensor data of the environmental characteristic.

19. A method according to claim 18, wherein the detecting comprises at least one of: inferring the start of the activation period in response to detecting one of the measured values not meeting the corresponding target value; and inferring the end of the activation period in response to detecting one of the measured values meeting the corresponding target value.

20. Apparatus for controlling an environmental control system arranged to control at least one environmental characteristic at a premises, comprising a processor and associated memory configured to:
receive a monitored data set comprising setpoint data, control signal data for one or more appliances, and sensor data for an environmental characteristic over a monitoring time period, wherein:
the setpoint data specifies one or more target values for the environmental characteristic over the monitoring time period, and the sensor data comprises measured values for said environmental characteristic over the monitoring time period;
compute one or more numerical features for the monitored data set based on the setpoint data and sensor data for the environmental characteristic over the monitoring time period, wherein the numerical features comprise a mean activation period for the one or more appliances and a mean difference between the setpoint data and the sensor data;
receive a model for detecting inefficiencies in environmental control systems, the model relating efficiency of environmental control systems to one or more numerical features derivable from a data set comprising setpoint data, control signal data for one or more appliances, and sensor data for an environmental characteristic controlled by environmental control systems, the one or more numerical features derivable from the data set comprising a mean activation period for the one or more appliances and a mean difference between the setpoint data and the sensor data, wherein the model comprises one or more rules for assigning one of a plurality of efficiency categories indicative of the efficiency of the monitored environmental control system based on the one or more numerical features, each rule comprising a threshold value for one of the one or more numerical features;
assign an efficiency category indicative of the efficiency of the monitored environmental control system over the monitoring time period, comprising inputting to the received model the one or more numerical features of the monitored data set computed based on the setpoint data, the control signal data for one or more appliances, and sensor data for said environmental characteristic over the monitoring time period;
identify a solution based on the assigned efficiency category, wherein the solution comprises adjusting one or more settings of the environmental control system; and
send a command to the environmental control system to adjust the one or more settings in response to identifying the solution.

21. A non-transient computer-readable medium comprising instructions which, when executed by a computer, cause the computer to carry out a method of controlling an environmental control system arranged to control at least one environmental characteristic at a premises, the instructions configured when executed to:
receive a monitored data set comprising setpoint data, control signal data for one or more appliances, and sensor data for an environmental characteristic over a monitoring time period, wherein the setpoint data specifies one or more target values for the environmental characteristic over the monitoring time period, and the sensor data comprise measured values for said environmental characteristic over the monitoring time period;
compute one or more numerical features for the monitored data set based on the setpoint data and sensor data for the environmental characteristic over the monitoring time period, wherein the numerical features comprise a mean activation period for the one or more appliances and a mean difference between the setpoint data and the sensor data;
receive a model for detecting inefficiencies in environmental control systems, the model relating efficiency of environmental control systems to one or more numerical features derivable from a data set comprising setpoint data, control signal data for one or more appliances, and sensor data for an environmental characteristic controlled by environmental control systems, the one or more numerical features derivable from the data set comprising a mean activation period for the one or more appliances and a mean difference between the setpoint data and the sensor data, wherein the model comprises one or more rules for assigning one of a plurality of efficiency categories indicative of the efficiency of the monitored environmental control system based on the numerical features, each rule comprising a threshold value for one of the one or more numerical features;
assign an efficiency category indicative of the efficiency of the monitored environmental control system over the monitoring time period, comprising inputting to the received model the one or more numerical features of the monitored data set computed based on the setpoint data, the control signal data for one or more appliances and the sensor data for said environmental characteristic over the monitoring time period;
identify a solution based on the assigned efficiency category, wherein the solution comprises adjusting one or more settings of the environmental control system; and
send a command to the environmental control system to adjust the one or more settings in response to identifying the solution.

* * * * *